United States Patent
Rojer

(10) Patent No.: US 7,962,888 B2
(45) Date of Patent: Jun. 14, 2011

(54) PRODUCING UNITARY CLASS DEFINITIONS FROM MODULE SPECIFICATIONS

(76) Inventor: Alan S. Rojer, Maplewood, NJ (US)

( * ) Notice: Subject to any disclaimer, the term of this patent is extended or adjusted under 35 U.S.C. 154(b) by 1098 days.

(21) Appl. No.: 11/786,313

(22) Filed: Apr. 11, 2007

(65) Prior Publication Data

US 2007/0256051 A1 Nov. 1, 2007

Related U.S. Application Data

(60) Provisional application No. 60/791,128, filed on Apr. 11, 2006.

(51) Int. Cl.
*G06F 9/44* (2006.01)
(52) U.S. Cl. ............ 717/100; 717/108; 717/116
(58) Field of Classification Search .......... 717/108, 717/116
See application file for complete search history.

(56) References Cited

U.S. PATENT DOCUMENTS

| | | | |
|---|---|---|---|
| 4,734,854 | A | 3/1988 | Afshar |
| 5,675,801 | A | 10/1997 | Lindsey |
| 5,699,310 | A | 12/1997 | Garloff |
| 6,721,807 | B2 | 4/2004 | Vlissides |
| 6,742,175 | B1 | 5/2004 | Brassard |
| 7,076,766 | B2 | 7/2006 | Wirts |
| 7,130,863 | B2 | 10/2006 | Diab |
| 7,137,100 | B2 | 11/2006 | Iborra |
| 7,237,224 | B1 | 6/2007 | Motoyama |
| 7,289,964 | B1 * | 10/2007 | Bowman-Amuah ......... 705/1.1 |
| 7,293,254 | B2 | 11/2007 | Bloesch |
| 7,444,618 | B2 | 10/2008 | Kulkarni |
| 7,590,969 | B2 | 9/2009 | Rajagopal |
| 7,669,191 | B1 | 2/2010 | Kelly |
| 2001/0025264 | A1 * | 9/2001 | Deaddio et al. ................ 705/36 |
| 2003/0058277 | A1 * | 3/2003 | Bowman-Amuah ......... 345/765 |
| 2005/0010894 | A1 | 1/2005 | Potter |
| 2006/0064667 | A1 | 3/2006 | Freitas |
| 2007/0079299 | A1 | 4/2007 | Daly |
| 2008/0065690 | A1 * | 3/2008 | Borgsmidt et al. ....... 707/103 Y |

OTHER PUBLICATIONS

Christian Grothoff, "The Runabout", 2003, pp. 103-125.*
Michael Duell, "Non-Software Examples of Software Design Patterns", 1997.*
Todd Millstein, "Practical Predicate Dispatch", 2004.*
Parnas, A Technique for Software Module Specification . . . , Comm. ACM 15:5, May 1972, pp. 330-336.
Buckles, Formal Module-Level Specifications, Proc. 1977 ACM Annual Conf., pp. 138-144.
Discepolo, Towards a Practical Specification Language, Proc. 1981 ACM Annual Conf., pp. 144-153.
Wasserman, The Object-Oriented Structured Design for Software Design Representation, Computer 23:3, Mar. 1990, 50-63.
Dedene, M.E.R.O.DE: A Model-driven Entity-Relationship Object-Oriented DEvelopment method, ACM SIGSOFT Software Engineering Notes 19:3, Jul. 1993, pp. 51-61.
Gamma, Design Patterns, Addison-Wesley, Reading, MA, 1995, pp. 331-344.

(Continued)

*Primary Examiner* — Wei Y Zhen
*Assistant Examiner* — Phillip H Nguyen

(57) ABSTRACT

A computer-implemented method of processing a module specification to produce predicator definitions is disclosed. The predicator definitions provide a facility for type-safe processing of generic elements (typically from markup processing or synthetic-language parsing) to specific elements suitable for accumulation as member data in an application-specific data structure. The method processes representations of modules, classes, and members. The predicators provided include a predicator base class definition, a plurality of predicator specializations, a promissary reference base class definition, and a plurality of promissary reference class definitions.

2 Claims, 45 Drawing Sheets

OTHER PUBLICATIONS

Cowan, Abstract Data Views: An Interface Specification Concept to Enhance Design for Reuse, IEEE Trans. on Software Engineering 21:3, Mar. 1995, pp. 229-243.

Palsberg, The Essence of the Visitor Pattern, 22nd International Computer Software and Application Conference, 1998, pp. 9 (IEEE Computer Society).

Mellor, Model-Driven Development, IEEE Software 20:5, Sep./Oct. 2003, pp. 14-18.

Bell, Death By UML Fever, ACM Queue 2:1, Mar. 2004, pp. 73-81.

Budinsky, Eclipse Modeling Framework, Addison-Wesley, Boston MA, 2004, pp. 95-113, 161-212.

Fowler, JeeWiz! Meta-Programming for the Real World, New Technology/enterprise Ltd, Nov. 2004, http://www.jeewiz.com/white_papers/TalkNotes_OOPSLA2004.pdf.

Object Management Group, Meta Object Facility (MOF) Core Specification, Version 2.0, formal/06-01-01, Jan. 2006, http://www.omg.org/spec/MOF/2.0/PDF/.

Balasubramanian, Developing Applications Using Model-Driven Design Environments, Computer 39:2, Feb. 2006, pp. 33-40.

Stahl, Model-Driven Software Development, John Wiley & Sons, Ltd., 2006, pp. 85-118.

* cited by examiner

FIG. 1

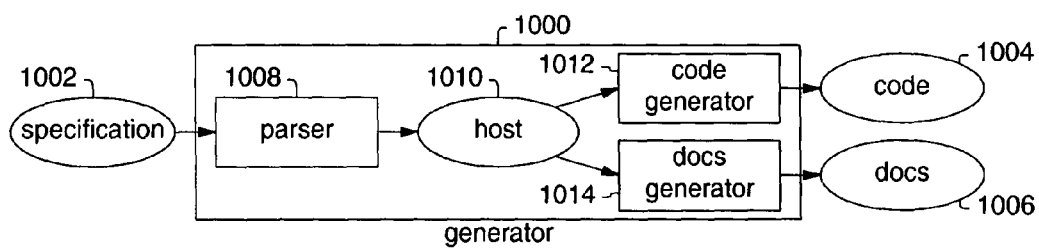

FIG. 2

```
dish^1016 [ host dishHost^1018 ] {
    Sequence<dishModule^1028> modules^1020 [meron];
    Sequence<dishType^1054> types^1022 [meron];
    dishElement^1024 {
        dishEntity^1026 {
            dishModule^1028 {
                Sequence<dishClass^1036> classes^1030 [meron];
                Sequence<dishClass^1036> forward_classes^1032 [meron];
                dishHostClass^1040 host^1034 [meron];
            }
            dishClass^1036 {
                Sequence<dishMember^1046> members^1038 [meron];
                dishHostClass^1040 {}
            }
            dishOperand^1042 {
                dishArgument^1044 {}
                dishMember^1046 {
                    dishMemberFunction^1048 {
                        Sequence<dishArgument^1044> arguments^1050 [meron];
                    }
                    dishMemberDatum^1052 {}
                }
            }
        }
    }
}
```

FIG. 3

```
            dish¹⁰¹⁶::::dishElement¹⁰²⁴ {
              dishType¹⁰⁵⁴ {
                dishVoidType¹⁰⁵⁶ {}
                dishValueType¹⁰⁵⁸ {
                  dishBitType¹⁰⁶⁰ {}
                  dishIntegerType¹⁰⁶² {}
                  dishCardinalType¹⁰⁶⁴ {}
                  dishTextType¹⁰⁶⁶ {}
                }
                dishReferenceType¹⁰⁶⁸ {}
                dishCompoundType¹⁰⁷⁰ {
                  dishSequenceType¹⁰⁷² {
                    dishValueSequenceType¹⁰⁷⁴ {}
                    dishReferenceSequenceType¹⁰⁷⁶ {}
                  }
                  dishSetType¹⁰⁷⁸ {
                    dishValueSetType¹⁰⁸⁰ {}
                    dishReferenceSetType¹⁰⁸² {}
                  }
                  dishMapType¹⁰⁸⁴ {
                    dishIndexMapType¹⁰⁸⁶ {}
                    dishScaleMapType¹⁰⁸⁸ {}
                    dishBindMapType¹⁰⁹⁰ {}
                    dishConvertMapType¹⁰⁹² {}
                  }
                }
              }
            }
            dish¹⁰¹⁶ { dimeLogger¹⁰⁹⁴ } {}
```

FIG. 4

```
            class dishHost¹⁰¹⁸ {
            public: // features...
              Sequence<dishModule¹⁰²⁸*> modules¹⁰²⁰;
              dishModule¹⁰²⁸* module¹⁰⁹⁶(Text t);
              Map<Text, dishModule¹⁰²⁸*> module_index¹⁰⁹⁸;
              Boolean accept_module¹¹⁰⁰(dishModule¹⁰²⁸* m);
              Sequence<dishType¹⁰⁵⁴*> types¹⁰²²;
              Boolean accept_type¹¹⁰²(dishType¹⁰⁵⁴* arg_0);
            };
```

FIG. 5

```
class dishElement{1024} {
public: // features...
   Text source{1104};
};
```

FIG. 6

```
class dishEntity{1026} : public dishElement{1024} {
public: // features...
   Text id{1106};
   Text term{1108};
   Text title{1110};
   Text purpose{1112};
   Text passage{1114};
   Sequence<Text> remarks{1116};
   Sequence<Text> notes{1118};
};
```

FIG. 7

```
class dishModule^1028 : public dishEntity^1026 {
public: // features...
    Sequence<dishClass^1036*> classes^1030;
    Map<Text, dishClass^1036*> class_index^1120;
    Boolean accept_class^1122(dishClass^1036* c);
    dishClass^1036* resolve_class^1124(Text id);
    Boolean sort_classes^1126(dimeLogger^1094* arg_0);
    Sequence<dishClass^1036*> forward_classes^1032;
    Boolean accept_forward_class^1128(dishClass^1036* f);
    Sequence<dishClass^1036*> root_classes^1132;
    dishHostClass^1040* host^1034;
    Boolean accept_host^1134(dishHostClass^1040* h);
    Text viewer_id^1136;
    Text editor_id^1138;
    Text factory_id^1140;
    Text factory_root_id^1142;
    Text auditor_id^1144;
    Text reflector_id^1146;
    Text parser_id^1148;
    Text resolver_id^1150;
    Text resolver_root_id^1154;
    Text resolver_id_field^1152;
    Text acceptor_id^1156;
    Text predicator_id^1158;
    Text qualifier_id^1160();
    Text singleton_id^1162();
    Text plurality_id^1164();
    Text predicator_sequence_id^1166();
    Text promissary_reference_id^1168();
    Text depository_id^1170();
    Text predicator_host_id^1172;
public: // cleanup...
    virtual ~dishModule^1028() {
        /* cleanup classes^1030 */
        /* cleanup forward_classes^1032 */
        /* cleanup host^1034 */ }
};
```

FIG. 8

```
class dishClass¹⁰³⁶ : public dishEntity¹⁰²⁶ {
public: // features...
   dishModule¹⁰²⁸* module¹¹⁷⁴;
   Sequence<dishClass¹⁰³⁶*> genera¹¹⁷⁶;
   Sequence<dishMember¹⁰⁴⁶*> members¹⁰³⁸;
   Map<Text, dishMember¹⁰⁴⁶*> member_index¹¹⁷⁸;
   Sequence<dishClass¹⁰³⁶*> species¹¹⁸⁰;
   Sequence<dishClass¹⁰³⁶*> genera_closure¹¹⁸²;
   Sequence<dishClass¹⁰³⁶*> species_closure¹¹⁸⁴;
   Boolean is_module_root¹¹⁸⁶;
   Boolean constructs_markup_element¹¹⁸⁸;
   Boolean accepts_markup_element¹¹⁹⁰;
   Boolean accepts_markup_text¹¹⁹²;
   Boolean accepts_markup_predicate¹¹⁹⁴;
   Boolean markup_configure¹¹⁹⁶;
   Boolean markup_commit¹¹⁹⁸;
   Boolean is_pure_abstract¹²⁰⁰;
   Boolean accept_member¹²⁰²(dishMember¹⁰⁴⁶* arg_0);
   Boolean provides_downcast¹²⁰⁴;
   Sequence<Text> tags¹²⁰⁶;
   Text acceptor_host_id¹²⁰⁸();
   Sequence<Text> audit_requirements¹²¹⁰;
   Text auditor_context¹²¹⁴;
public: // cleanup...
   virtual ~dishClass¹⁰³⁶() {
      /* cleanup members¹⁰³⁸ */ }
};
```

FIG. 9

```
class dishHostClass¹⁰⁴⁰ : public dishClass¹⁰³⁶ {};
```

FIG. 10

```
class dishOperand¹⁰⁴² : public dishEntity¹⁰²⁶ {
public: // features...
   Text scope_handle¹²¹⁶;
   Boolean validate_handle¹²¹⁸(Text h);
   Boolean accept_scope_handle¹²²⁰(Text h);
   Text scope_id¹²²²;
   Boolean is_const¹²²⁴;
   dishType¹⁰⁵⁴* type¹²²⁶;
};
```

FIG. 11

```
class dishArgument¹⁰⁴⁴ : public dishOperand¹⁰⁴² {
public: // features...
   Cardinal position¹²²⁸;
   Text arg_default¹²³⁰;
};
```

FIG. 12

```
class dishMember¹⁰⁴⁶ : public dishOperand¹⁰⁴² {
public: // features...
   dishClass¹⁰³⁶* member_class¹²³²;
};
```

FIG. 13

```
class dishMemberFunction¹⁰⁴⁸ : public dishMember¹⁰⁴⁶ {
public: // features...
   Boolean is_static¹²³⁴;
   Boolean is_virtual¹²³⁶;
   Boolean is_pure¹²³⁸;
   Sequence<dishArgument¹⁰⁴⁴*> arguments¹⁰⁵⁰;
   Sequence<Text> inline_definition¹²⁴⁰;
   Sequence<Text> definition¹²⁴²;
   Text indicates¹²⁴⁴;
public: // cleanup...
   virtual ~dishMemberFunction¹⁰⁴⁸() {
      /* cleanup arguments¹⁰⁵⁰ */ }
};
```

FIG. 14

```
class dishMemberDatum^1052 : public dishMember^1046 {
public: // features...
   Boolean is_meron^1246;
   Boolean is_mutable^1248;
   Text init^1250;
   Text predicator_class_id^1252();
   Text promissary_class_id^1254();
   Text acceptor_class_id^1256();
   Text generic_acceptor_id^1258();
   dishMemberFunction^1048* acceptor^1260;
   Boolean inhibit_predicator^1262;
   Sequence<Text> tags^1264;
   Sequence<Text> handles^1266;
   Boolean accept_handle^1268(Text t);
};
```

FIG. 15

```
class dishType^1054 : public dishElement^1024 {
public: // features...
   Text type_text^1270();
   Boolean is_plural^1272();
};
```

FIG. 16

```
class dishVoidType^1056 : public dishType^1054 {
public: // features...
   Text type_text^1274();
};
```

FIG. 17

```
class dishValueType^1058 : public dishType^1054 {};
```

FIG. 18

```
class dishBitType^1060 : public dishValueType^1058 {
public: // features...
   Text type_text^1276();
};
```

FIG. 19

```
class dishIntegerType^1062 : public dishValueType^1058 {
public: // features...
   Text type_text^1278();
};
```

FIG. 20

```
class dishCardinalType^1064 : public dishValueType^1058 {
public: // features...
   Text type_text^1280();
};
```

FIG. 21

```
class dishTextType^1066 : public dishValueType^1058 {
public: // features...
   Text type_text^1282();
};
```

FIG. 22

```
class dishReferenceType^1068 : public dishType^1054 {
public: // features...
   Text reference_class_id^1284;
   Text type_text^1286();
};
```

FIG. 23

```
class dishCompoundType¹⁰⁷⁰ : public dishType¹⁰⁵⁴ {
public: // features...
   Sequence<dishType¹⁰⁵⁴*> parameters¹²⁸⁸;
   Text type_text¹²⁹⁰();
   Text compound_text¹²⁹²();
   Boolean is_plural¹²⁹⁴();
   dishType¹⁰⁵⁴* range¹²⁹⁶;
};
```

FIG. 24

```
class dishSequenceType¹⁰⁷² : public dishCompoundType¹⁰⁷⁰ {
public: // features...
   Text compound_text¹²⁹⁸();
};
```

FIG. 25

```
class dishValueSequenceType¹⁰⁷⁴ : public dishSequenceType¹⁰⁷² {
public: // features...
   dishValueType¹⁰⁵⁸* value_range¹³⁰⁰;
};
```

FIG. 26

```
class dishReferenceSequenceType¹⁰⁷⁶ : public dishSequenceType¹⁰⁷² {
public: // features...
   dishReferenceType¹⁰⁶⁸* reference_range¹³⁰²;
};
```

FIG. 27

```
class dishSetType^1078 : public dishCompoundType^1070 {
public: // features...
  Text compound_text^1304();
};
```

FIG. 28

```
class dishValueSetType^1080 : public dishSetType^1078 {
public: // features...
  dishValueType^1058* value_range^1306;
};
```

FIG. 29

```
class dishReferenceSetType^1082 : public dishSetType^1078 {
public: // features...
  dishReferenceType^1068* reference_range^1308;
};
```

FIG. 30

```
class dishMapType^1084 : public dishCompoundType^1070 {
public: // features...
   dishType^1054* domain^1310;
   Text compound_text^1312();
};
```

FIG. 31

```
class dishIndexMapType^1086 : public dishMapType^1084 {
public: // features...
   dishValueType^1058* value_domain^1314;
   dishReferenceType^1068* reference_range^1316;
};
```

FIG. 32

```
class dishScaleMapType^1088 : public dishMapType^1084 {
public: // features...
   dishReferenceType^1068* reference_domain^1318;
   dishValueType^1058* value_range^1320;
};
```

FIG. 33

```
class dishBindMapType^1090 : public dishMapType^1084 {
public: // features...
   dishReferenceType^1068* reference_domain^1322;
   dishReferenceType^1068* reference_range^1324;
};
```

FIG. 34

```
class dishConvertMapType^1092 : public dishMapType^1084 {
public: // features...
   dishValueType^1058* value_domain^1326;
   dishValueType^1058* value_range^1328;
};
```

FIG. 35

```
class dimeLogger^1094 {};
```

FIG. 36

```
mscan¹³³⁰ {
  mscanFile¹³³² {
    mscanDirectory¹³³⁴ {
      mscanTopDirectory¹³³⁶ {}
    }
    mscanRegularFile¹³³⁸ {
      mscanAudioFile¹³⁴⁰ {}
      mscanVideoFile¹³⁴² {}
    }
  }
}
```

FIG. 37

```
mscan¹³³⁰ [
  host mscanHost¹³⁵²;
  viewer mscanViewer¹³⁵⁶;
  factory mscanFactory¹³⁵⁸;
  factory-root mscanFile¹³³²;
] {
  Set<mscanFile¹³³²> _root_files¹³⁵⁴ [meron];
  mscanFile¹³³² {
    mscanDirectory¹³³⁴ _parent¹³⁴⁴;
    Text _name¹³⁴⁶;
    Text path¹³⁴⁸() [virtual; const] ;
    mscanDirectory¹³³⁴ {
      [tag 'folder']
      Set<mscanFile¹³³²> _files¹³⁵⁰ [meron];
      Bit accept¹³⁶⁰(mscanFile¹³³²);
      mscanTopDirectory¹³³⁶ {
        Text path¹³⁶²() [virtual; const] ;
      }
    }
    mscanRegularFile¹³³⁸ {
      mscanAudioFile¹³⁴⁰ [tag 'mp3', 'wav', 'ogg'] {}
      mscanVideoFile¹³⁴² [tag 'mpg', 'mpeg', 'mov', 'avi', 'mp4'] {}
    }
  }
}
```

*FIG. 38*

```
class mscanFile1332 {
private:
  // members...
  mscanDirectory1334* _parent1344;
  Text _name1346;
public:
  // view access to members...
  const mscanDirectory1334* parent() const {return _parent1344;}
  Text name() const {return _name1346;}
public:
  // edit access to members...
  mscanDirectory1334* parent() {return _parent1344;}
public:
  // reset access to members...
  void set_parent(mscanDirectory1334* s);
  void set_name(Text s) {_name1346 = s;}
public:
  // member acceptors...
  bool parent_accept(mscanDirectory1334* r) {set_parent(r); return 1;}
  bool name_accept(Text v) {set_name(v); return 1;}
public:
  // additional methods...
  virtual Text path1348() const;
public:
  // dispatch to viewer...
  virtual bool dispatch_view(mscanViewer1356&) const;
private:
  virtual const char *me() const {return "mscanFile";}
public:
  // factory...
  mscanFile();
  virtual ~mscanFile() {}
};
```

*FIG. 39*

```
bool
mscanFile1332::dispatch_view(mscanViewer1356 &v) const
{
  return v.view(this);
}
```

FIG. 40

```
typedef dimePointerSet<mscanFile^1332> mscanFileSet;

class mscanHost^1352 {
private:
  // members...
  mscanFileSet _root_files^1354;
  mscanFactory^1358 _factory;
  mutable dimeLogger *_logger;
public:
  // view access to members...
  const mscanFileSet& root_files() const {return _root_files^1354;}
  const mscanFactory^1358& factory() const {return _factory;}
  dimeLogger *logger() const {return _logger;}
public:
  // edit access to members...
  mscanFileSet& root_files() {return _root_files^1354;}
  mscanFactory& factory() {return _factory;}
public:
  // reset access to members...
  void set_logger(dimeLogger *l) {_logger = l;}
public:
  // member acceptors...
  bool root_files_accept(mscanFile^1332 *r) {_root_files.insert(r); return 1;}
public:
  // viewers for compound members...
  mscanFileSet::Viewer root_files_viewer() const;
public:
  // editors for compound members...
  mscanFileSet::Editor root_files_editor() ;
public:
  // factory...
  mscanHost(dimeLogger *l=0);
  virtual ~mscanHost();
private:
  // prohibited...
  mscanHost(const mscanHost&);
  mscanHost& operator=(const mscanHost&);
};
```

FIG. 41

```
class mscanViewer^1356 {
public:
  // factory...
  mscanViewer() {}
  virtual ~mscanViewer() {}
private:
  // prohibited...
  mscanViewer(const mscanViewer^1356&);
  mscanViewer& operator=(const mscanViewer^1356&);
public:
  virtual bool view(const mscanFile^1332*);
  virtual bool view(const mscanDirectory^1334*);
  virtual bool view(const mscanTopDirectory^1336*);
  virtual bool view(const mscanRegularFile^1338*);
  virtual bool view(const mscanAudioFile^1340*);
  virtual bool view(const mscanVideoFile^1342*);
public:
  bool view_agg(const mscanFileSet&);
  bool view_agg(mscanFileSet::Viewer);
public:
  bool view_base(const mscanFile^1332*);
  bool view_base(const mscanDirectory^1334*);
  bool view_base(const mscanTopDirectory^1336*);
  bool view_base(const mscanRegularFile^1338*);
  bool view_base(const mscanAudioFile^1340*);
  bool view_base(const mscanVideoFile^1342*);
};
```

FIG. 42

```
bool
mscanViewer^1356::view(const mscanFile^1332* e)
{
  return view_base(e);
} bool
mscanViewer^1356::view_base(const mscanFile^1332* e)
{
  return 1;
} bool
mscanViewer^1356::view_agg(const mscanFileSet &a)
{
  return view_agg(mscanFileSet::Viewer(a));
} bool
mscanViewer^1356::view_agg(mscanFileSet::Viewer ii)
{
  dime_foreach(const mscanFile^1332*, e, ii)
    if (!e->dispatch_view(*this)) return 0;
  return 1;
} bool
mscanViewer^1356::view(const mscanDirectory^1334* e)
{
  if (!view_agg(e->files())) return 0;
  return view_base(e);
} bool
mscanViewer^1356::view_base(const mscanDirectory^1334* e)
{
  if (!e->mscanFile^1332::dispatch_view(*this)) return 0;
  return 1;
}

```
class mscanFactory¹³⁵⁸ {
public:
  // instantiators...
  virtual mscanFile¹³³² *instantiate¹³⁶⁴(dimeText);
public:
  // factory...
  mscanFactory¹³⁶⁶();
  virtual ~mscanFactory() {}
private:
  // ctors...
  static mscanFile¹³³²* mscanFile_ctor();
  static mscanFile¹³³²* mscanDirectory_ctor();
  static mscanFile¹³³²* mscanTopDirectory_ctor();
  static mscanFile¹³³²* mscanRegularFile_ctor();
  static mscanFile¹³³²* mscanAudioFile_ctor();
  static mscanFile¹³³²* mscanVideoFile_ctor();
private:
  // members...
  typedef mscanFile¹³³²* (Ctor)();
  typedef dimeIndex<dimeText, Ctor> CtorMap;
  CtorMap _ctor_map;
};
```

FIG. 44

```
class dimeFileWalker[1374] {
  // ...
public:
  bool visit[1376](dimeText path);
};

class mscanBuilder[1368] : public dimeFileWalker {
public:
  mscanBuilder(mscanHost[1352] &);
  virtual ~mscanBuilder();
public:
  mscanHost[1352] &host() {return _host;}
  const mscanHost[1352] &host() const {return _host;}
  // bool visit[1376](dimeText path); // ...provided the base class
public:
  // responders for dimeFileWalker...
  virtual bool root_dir_open[1378](dimeText, const struct stat*);
  virtual bool dir_open[1382](dimeText, dimeText, const struct stat*);
  virtual bool regular_file[1386](dimeText, dimeText, const struct stat*);
  virtual bool dir_close[1384](dimeText, dimeText, const struct stat*);
  virtual bool root_dir_close[1380](dimeText, const struct stat*);
private:
  mscanHost[1352] &_host;
  pcre *_ext_regexp;
  typedef dimePointerSequence<mscanDirectory[1334]> Stack;
  Stack _stack;
};
```

FIG. 45

```
bool
mscanBuilder$^{1368}$::root_dir_open$^{1378}$(dimeText path,
  const struct stat *)
{
  mscanDirectory$^{1334}$ *d = new mscanTopDirectory$^{1336}$;
  d->set_name(path);
  if (_stack) return fail(path, "non-empty stack at root!?!");
  _host.accept(d);
  _stack.push(d);
  return 1;
} bool
mscanBuilder$^{1368}$::dir_open$^{1382}$(dimeText dirpath, dimeText name,
  const struct stat *)
{
  mscanDirectory$^{1334}$ *d = new mscanDirectory$^{1334}$;
  d->set_name(name);
  if (!_stack)
    return fail(dirpath, name, "empty stack on non-root directory!?!");
  _stack.top()->accept(d);
  _stack.push(d);
  return 1;
} bool
mscanBuilder$^{1368}$::regular_file$^{1386}$(dimeText dirpath, dimeText name,
  const struct stat *)
{
  dimeText ext;
  // ...PCRE processing to get ext from name omitted
  // ...cf. man 3 pcreapi, http://www.prce.org/
  // try to get an mscanFile from the factory...
  mscanFile$^{1332}$ *f = host().factory().instantiate(ext);
  if.(f) {
    f->set_name(name);
    if (_stack) _stack.top()->accept(f);
    else return fail(dirpath, name, "empty stack on regular file!?!");
  }
  return 1;
}
```

FIG. 46

```
class mscanPage^1388 {
public:
  mscanPage(dimeText dir_path, dimeLogger *l=0); // ...root page
  mscanPage(const mscanPageStack&, dimeText name, dimeText title,
     dimeLogger *l=0); // ...top-level page
  mscanPage(const mscanPageStack&, dimeText name, dimeLogger *l=0);
     // ...all other pages
  virtual ~mscanPage() {}
public:
  void accumulate(const mscanPage^1388 &);
  void accumulate(const mscanVideoFile^1342 *);
  void accumulate(const mscanAudioFile^1340 *);
public:
  bool write();
private:
  bool fail(dimeText msg);
  void init(const mscanPageStack&);
  void init();
public:
  dimeText _dir_path, _name, _title;
  size_t _video_count, _closure_video_count;
  size_t _audio_count, _closure_audio_count;
  dimeTextSequence _parent_links, _child_links;
  dimeTextSequence _video_links, _audio_links;
};
```

FIG. 47

```
class mscanHtmlWriter¹³⁷⁰ : public mscanViewer¹³⁵⁶ {
public:
   mscanHtmlWriter(const mscanHost¹³⁵² &, dimeText target);
   virtual ~mscanHtmlWriter();
public:
   virtual bool view(const mscanTopDirectory¹³³⁶ *);
   virtual bool view(const mscanDirectory¹³³⁴ *);
   virtual bool view(const mscanVideoFile¹³⁴² *);
   virtual bool view(const mscanAudioFile¹³⁴⁰ *);
public:
   bool failed() const {return _failed;}
   bool fail(dimeText msg);
   bool fail(const mscanFile *, dimeText msg);
private:
   bool require_dir(dimeText);
   typedef dimeConstPointerSequence<mscanFile> FileSequence;
   void sort_files(const mscanDirectory *, FileSequence&);
   bool view_agg(const FileSequence&);
   bool dir_page(const mscanDirectory¹³³⁴ *, mscanPage¹³⁸⁸ &);
private:
   const mscanHost¹³⁵²& _host;
   dimeText _target;
   size_t _top_count;
   mscanPage¹³⁸⁸* _index_page;
   typedef dimePointerSequence<mscanPage¹³⁸⁸> Stack;
   Stack _stack;
   bool _failed;
};
```

*FIG. 48*

```
bool
mscanHtmlWriter1370::dir_page(const mscanDirectory1334 *d, mscanPage1388 &dp)
{
  bool ok = 1;
  if (!_stack) return fail(d, "empty stack!?!");
  if (!require_dir(dp.dir_path())) return fail(d, "couldn't create directory");
  { // visit constituents recursively...
    _stack.push(&dp);
    FileSequence s; sort_files(d, s);
    if (!view_agg(s)) ok = 0;
    _stack.pop();
  }
  if (!dp.write()) return fail(d, "write failed");
  _stack.top()->accumulate(dp);
  return ok;
} bool
mscanHtmlWriter1370::view(const mscanTopDirectory1336 *d)
{
  dimePrintf name("topdir-%02u", _top_count++);
  mscanPage1388 dp(_stack, name, d->name(), logger());
  if (!dir_page(d, dp)) return fail(d, "dir-page failed");
  return 1;
} bool
mscanHtmlWriter1370::view(const mscanDirectory1334 *d)
{
  mscanPage1388 dp(_stack, d->name(), logger());
  if (!dir_page(d, dp)) return fail(d, "dir-page failed");
  return 1;
} bool
mscanHtmlWriter1370::view_agg(const FileSequence &s)
{
  FileSequence::Viewer ii(s);
  dime_foreach(const mscanFile1332 *, f, ii) {
    if (!f->dispatch_view(*this)) return 0;
  }
  return 1;
}
```

FIG. 49

```
bool
mscanHtmlWriter¹³⁷⁰::view(const mscanVideoFile¹³⁴² *f)
{
  if (!_stack) return fail(f, "empty stack!?!");
  _stack.top()->accumulate(f);
  return 1;
} bool
mscanHtmlWriter¹³⁷⁰::view(const mscanAudioFile¹³⁴⁰ *f)
{
  if (!_stack) return fail(f, "empty stack!?!");
  _stack.top()->accumulate(f);
  return 1;
}
```

FIG. 50

```
int main¹³⁷²(int argc, char **argv) {
  const char *me = "mscan-writer";
  dimePrintf usage("usage: %s path [path...] target", me);
  // ...argument verification omitted for brevity
  dimeText target(argv[--argc]);
  int arg = 1;
  bool failed = 0;
  dimeStreamLogger logger(cerr);
  mscanHost¹³⁵² host(&logger);
  mscanBuilder¹³⁶⁸ builder(host);
  while (arg < argc) {
    const char *path = argv[arg++];
    dimeLoggerContext path_context(&logger, path);
    if (!builder.visit¹³⁷⁶(path)) failed = 1;
  }
  if (!failed) {
    // write some html...
    mscanHtmlWriter¹³⁷⁰ writer(host, target);
    if (writer.failed()) {
      logger.fail("writer failed");
      failed = 1;
    }
  }
  return !failed ? 0 : -1;
}
```

FIG. 52

```
// includes¹⁴³⁰...
#include "dimeSet.h"
#include "dimeText.h"

// forwards¹³⁹²...
class mscanFile¹³³²;
   class mscanDirectory¹³³⁴;
      class mscanTopDirectory¹³³⁶;
   class mscanRegularFile¹³³⁸;
      class mscanAudioFile¹³⁴⁰;
      class mscanVideoFile¹³⁴²;

// module-services¹⁴³²...
class mscanHost¹³⁵²;
class mscanViewer¹³⁵⁶;
class mscanFactory¹³⁵⁸;

// typedefs¹⁴³⁴...
typedef dimePointerSet<mscanFile¹³³²> mscanFileSet;
```

*FIG. 53*

```
// class definition from class-definitions1396...
class mscanDirectory1334 : public mscanFile1332 {
private:
   // member-datum-definitions1438...
   mscanFileSet _files1350;
public:
   // view-member-access1440...
   const mscanFileSet& files() const {return _files1350;}
public:
   // edit-member-access1442...
   mscanFileSet& files() {return _files1350;}
public:
   // uniform-member-acceptors1446...
   bool files_accept(mscanFile *r) {_files1350.insert(r); return 1;}
public:
   // compound-member-viewers1448...
   mscanFileSet::Viewer files_viewer() const {
      return mscanFileSet::Viewer(_files);
   }
public:
   // compound-member-editors1450...
   mscanFileSet::Editor files_editor() {
      return mscanFileSet::Editor(_files);
   }
public:
   // specified-member-functions1452...
   dimeBit accept(mscanFile*);
public:
   // viewer-dispatch1454...
   virtual bool dispatch_view(mscanViewer&) const;
public:
   // reflector-interface1456...
   static dimeText static_class_id();
   virtual dimeText class_id() const {return static_class_id();}
public:
   // factory1458...
   mscanDirectory() {}
   virtual ~mscanDirectory();
};
```

FIG. 54

```
// viewer¹⁴⁰⁰...
class mscanViewer¹³⁵⁶ {
public:
  // factory...
  mscanViewer() {}
  virtual ~mscanViewer() {}
public:
  // view-members¹⁴⁶⁰ declarations...
  virtual bool view(const mscanFile¹³³²*);
  virtual bool view(const mscanDirectory¹³³⁴*);
  virtual bool view(const mscanTopDirectory¹³³⁶*);
  virtual bool view(const mscanRegularFile¹³³⁸*);
  virtual bool view(const mscanAudioFile¹³⁴⁰*);
  virtual bool view(const mscanVideoFile¹³⁴²*);
public:
  // view-agg-members¹⁴⁶⁴ declarations...
  bool view_agg(const mscanFileSet&);
  bool view_agg(mscanFileSet::Viewer);
public:
  // view-base-members¹⁴⁶² declarations...
  bool view_base(const mscanFile¹³³²*);
  bool view_base(const mscanDirectory¹³³⁴*);
  bool view_base(const mscanTopDirectory¹³³⁶*);
  bool view_base(const mscanRegularFile¹³³⁸*);
  bool view_base(const mscanAudioFile¹³⁴⁰*);
  bool view_base(const mscanVideoFile¹³⁴²*);
};
```

FIG. 55

```
// view-members[1460] definitions...
bool
mscanViewer[1356]::view(const mscanFile[1332]* e)
{
  return view_base(e);
} bool
mscanViewer[1356]::view(const mscanDirectory[1334]* e)
{
  if (!view_agg(e->files())) return 0;
  return view_base(e);
}

// view-base-members[1462] definitions...
bool
mscanViewer[1356]::view_base(const mscanFile[1332]* e)
{
  return 1;
} bool
mscanViewer[1356]::view_base(const mscanDirectory[1334]* e)
{
  if (!e->mscanFile[1332]::dispatch_view(*this)) return 0;
  return 1;
}

// view-agg-members[1464] definitions...
bool
mscanViewer[1356]::view_agg(const mscanFileSet &a)
{
  return view_agg(mscanFileSet::Viewer(a));
} bool
mscanViewer[1356]::view_agg(mscanFileSet::Viewer ii)
{
  dime_foreach(const mscanFile[1332]*, e, ii)
    if (!e->dispatch_view(*this)) return 0;
  return 1;
}
```

FIG. 56

```
dr4s¹⁴⁷² [acceptor-id dr4sAcceptor¹⁴⁷⁴] {
  dr4sElement¹⁴⁷⁶ {
    dr4sItem¹⁴⁷⁸ [tag item] {}
    dr4sChannel¹⁴⁸⁰ [tag channel] {
      Sequence<dr4sItem¹⁴⁷⁸> _items¹⁴⁸² [meron; tag 'item'];
    }
  }
}
```

FIG. 57

```
// base-acceptor¹⁴⁶⁶ definition...
class dr4sAcceptor¹⁴⁷⁴ {
public:
  virtual bool accept(dr4sElement¹⁴⁷⁶ *);
  virtual bool accept(dr4sItem¹⁴⁷⁸ *);
  virtual bool accept(dr4sChannel¹⁴⁸⁰ *);
};
```

*FIG. 58*

```
// base-acceptor¹⁴⁶⁶ methods...
bool
dr4sAcceptor¹⁴⁷⁴::accept(dr4sElement¹⁴⁷⁶ *e)
{
  return 0;
} bool
dr4sAcceptor¹⁴⁷⁴::accept(dr4sItem¹⁴⁷⁸ *e)
{
  if (accept((dr4sElement¹⁴⁷⁶*) e)) return 1;
  return 0;
} bool
dr4sAcceptor¹⁴⁷⁴::accept(dr4sChannel¹⁴⁸⁰ *e)
{
  if (accept((dr4sElement¹⁴⁷⁶*) e)) return 1;
  return 0;
}
```

*FIG. 59*

```
// specialized-acceptors¹⁴⁶⁸ definition...
class dr4sChannel_itemsAcceptor¹⁴⁸⁴ : public dr4sAcceptor¹⁴⁷⁴ {
public:
   dr4sChannel_itemsAcceptor(dr4sChannel¹⁴⁸⁰ *t) : _target(t) {}
public:
   bool accept(dr4sItem¹⁴⁷⁸*) {return _target->items_accept(c);}
private:
   dr4sChannel¹⁴⁸⁰* _target;
};
```

*FIG. 60*

```
// acceptor-hosts¹⁴⁷⁰ definition...
class dr4sChannelAcceptorHost¹⁴⁸⁶ {
public:
  dr4sChannelAcceptorHost();
  dr4sAcceptor¹⁴⁷⁴* acceptor¹⁴⁹⁰(dr4sChannel¹⁴⁸⁰* target, dimeText tag);
  dr4sElement¹⁴⁷⁶* instantiate¹⁴⁸⁸(dimeText tag);
private:
  // acceptor instantiators (Ator)....
  static dr4sAcceptor¹⁴⁷⁴* dr4sChannel_itemsAcceptor_ator(dr4sChannel¹⁴⁸⁰ *t) {
    return new dr4sChannel_itemsAcceptor¹⁴⁸⁴(t);
  }
  // context-instantiators (Itor)....
  static dr4sElement¹⁴⁷⁶* dr4sChannel_itemsAcceptor_itor() {
    return new dr4sItem¹⁴⁷⁸;
  }
private:
  typedef dr4sAcceptor¹⁴⁷⁴* (Ator)(dr4sChannel¹⁴⁸⁰*);
  typedef dimeIndex<dimeText, Ator> AtorMap;
  AtorMap _ator_map;
  typedef dr4sElement¹⁴⁷⁶* (Itor)();
  typedef dimeIndex<dimeText, Itor> ItorMap;
  ItorMap _itor_map;
};
```

*FIG. 61*

```
// acceptor-hosts¹⁴⁷⁰ definition...
dr4sChannelAcceptorHost¹⁴⁸⁶::dr4sChannelAcceptorHost() {
  _ator_map["item"] = &dr4sChannel_itemsAcceptor_ator;
  _itor_map["item"] = &dr4sChannel_itemsAcceptor_itor;
} dr4sAcceptor¹⁴⁷⁴*
dr4sChannelAcceptorHost¹⁴⁸⁶::acceptor¹⁴⁹⁰(dr4sChannel¹⁴⁸⁰* target, dimeText tag) {
  Ator *ator = _ator_map(tag);
  return ator ? (*ator)(target) : 0;
} dr4sElement¹⁴⁷⁶*
dr4sChannelAcceptorHost¹⁴⁸⁶::instantiate¹⁴⁸⁸(dimeText tag) {
  Itor *itor = _itor_map(tag);
  return itor ? (*itor)() : 0;
}
```

FIG. 62

```
class dr4sElement {
public: // markup responders...
  // ...
  virtual bool accept_element(dimeText, dr4sElement*, dr4sHost&);
  // ...
public:
  // dispatch to acceptor...
  virtual bool dispatch_acceptor(dr4sAcceptor&);
  virtual dr4sAcceptor* request_acceptor(dr4sFactory&, dimeText);
  // ...
};

class dr4sChannel : public dr4sElement {
private:
  // members...
  dr4sItemSequence _items;
  // ...
public:
  // member acceptors...
  bool items_accept(dr4sItem *r) {_items.push_back(r); return 1;}
public:
  // dispatch to acceptor...
  virtual bool dispatch_acceptor(dr4sAcceptor &a) {return a.accept(this);}
  virtual dr4sAcceptor* request_acceptor(dr4sFactory[1542] &f, dimeText tag) {
    return f.request_acceptor(this, tag);
  }
  virtual dr4sElement* request_instantiation(dr4sFactory[1542] &f, dimeText tag) {
    return f.request_instantiation(this, tag);
  }
  // ...
};
```

FIG. 63

```
bool
dr4sElement::accept_element(dimeText t, dr4sElement *e, dr4sHost &h)
{
  dr4sAcceptor¹⁴⁷⁴ *a = request_acceptor(h.factory(), t);
  if (a) {
    if (!e->dispatch_acceptor(*a)) {
      h.logger()->warn("%s: %s: declined", class_id().s(), t.s());
      delete e;
    }
    delete a;
  }
  else {
    h.logger()->warn("%s: %s: no acceptor", class_id().s(), t.s());
    delete e;
  }
  return 1;
}
```

FIG. 64

```
// predicator definitions¹⁴¹²...

// predicator base class definitions¹⁴⁹²...
class dishPredicator¹⁵⁰⁸ {
public:
  // generic predicator apply operations¹⁴⁹⁴...
  virtual bool apply(dishModule¹⁰²⁸ *, dishHost¹⁰¹⁸ &) const;
  virtual bool apply(dishClass¹⁰³⁶ *, dishHost¹⁰¹⁸ &) const;
  virtual bool apply(dishMemberDatum¹⁰⁵² *, dishHost &) const;
  // ...
private:
  dimeText _tag;
};

class dishPredicatorQualifier¹⁵¹⁰ : public dishPredicator¹⁵⁰⁸ {};

class dishPredicatorSingleton¹⁵¹² : public dishPredicator¹⁵⁰⁸ {
  // ...
private:
  dimeText _complement;
};

class dishPredicatorPlurality¹⁵¹⁴ : public dishPredicator¹⁵⁰⁸ {
  // ...
private:
  dimeTextSequence _complements;
};
```

*FIG. 65*

```cpp
// predicator definitions1412...
// predicator specializations1496...
// example of value predicator specialization1518...
class dish_accepts_markup_elementQualifier1516
  : public dishPredicatorQualifier1510 {
public:
  // example of specific predicator apply operations1498...
  // example of value specific predicator apply operation1520...
  bool apply(dishClass1036 *e, dishHost &) const {
    return e->accepts_markup_element_accept(1);
  }
};

// example of instantiating predicator specialization1524...
class dish_hostSingleton1522 : public dishPredicatorSingleton1512 {
public:
  // example of specific predicator apply operations1498...
  // example of instantiating specific predicator apply operation1526...
  bool apply(dishModule1028 *e, dishHost1018 &) const {
    dishHostClass1040 *m = new dishHostClass1040;
    m->id_accept(_complement);
    return e->host_accept(m);
  }
};
```

*FIG. 66*

```cpp
// predicator definitions1412...
// promissary reference base class definition1500...
class dishPredicatorPromissaryReference1528 {
public:
  dishPredicatorPromissaryReference(dimeText t, dimeText id, dimeText s)
    : _tag(t), _id(id), _source(s) {}
  // ...
  // promissary resolve operation1530...
  bool resolve(dishHost1018 &c, dimeLogger *) const {
    dishEntity1026 *e = c.resolver().resolve(_id);
    if (!e) return 0;
    return e->dispatch_resolution(*this, c);
  }
  // generic promissary acceptor operations1502...
  // ...
  virtual bool accept(dishMemberDatum *, dishHost &) const;
private:
  dimeText _tag, _id, _source;
};
```

FIG. 67

```
// predicator definitions1412...
class dishMemberDatum1052 : public dishMember {
private:
  dishMemberFunction1048* acceptor1260;
public:
  bool acceptor_accept(dishMemberFunction1048* r) {acceptor1260=r; return 1;}
};

class dishMemberFunction1048 : public dishMember {
public:
  // promissary dispatch1532...
  virtual bool dispatch_resolution(
    const dishPredicatorPromissaryReference &pr, dishHost &c)
  {
    return pr.accept(this, c);
  }
  // ...
};

// example of promissary reference definition1504...
class dishMemberDatum_acceptorPromissaryReference1534
    : public dishPredicatorPromissaryReference1528
{
public:
  dishMemberDatum_acceptorPromissaryReference(dishMemberDatum* t,
    dimeText tag, dimeText id, dimeText source)
    : dishPredicatorPromissaryReference(tag, id, source), _target(t) {}
  // example of specific promissary acceptor operations1506...
  bool accept(dishMemberFunction1048 *m, dishHost&) const {
    _target->acceptor_accept(m);
  }
private:
  dishMemberDatum* _target;
};

// example of predicator specializations1496...
// example of promissary predicator specialization1538...
class dish_acceptorSingleton : public dishPredicatorSingleton {
public:
  // example of specific predicator apply operations1498...
  // example of promissary specific predicator apply operation1540...
  bool apply(dishMemberDatum *e, dishHost &c) const {
    c.depository() << new dishMemberDatum_acceptorPromissaryReference1534(
        e, tag(), complement(), source());
  }
  return 1;
};
```

FIG. 68

```
// factory¹⁴¹⁶...
class dr4sFactory¹⁵⁴² {
public:
  dr4sFactory();
public:
  // instantiators¹⁵⁴⁴...
  virtual dr4sElement¹⁴⁷⁶ *instantiate(dimeText);
  virtual dr4sElement¹⁴⁷⁶ *instantiate(dr4sElement*, dimeText);
public:
  // acceptor-responders¹⁵⁴⁶...
  dr4sAcceptor¹⁴⁷⁴* request_acceptor(dr4sElement¹⁴⁷⁶*, dimeText);
  dr4sAcceptor¹⁴⁷⁴* request_acceptor(dr4sItem¹⁴⁷⁸*, dimeText);
  dr4sAcceptor¹⁴⁷⁴* request_acceptor(dr4sChannel¹⁴⁸⁰*, dimeText);
  // ...
public:
  // context-instantiator-responders¹⁵⁴⁸...
  dr4sElement¹⁴⁷⁶* request_instantiation(dr4sElement¹⁴⁷⁶*, dimeText);
  dr4sElement¹⁴⁷⁶* request_instantiation(dr4sItem¹⁴⁷⁸*, dimeText tag) {
    return _dr4sItemAcceptorHost.instantiate(tag);
  }
  dr4sElement¹⁴⁷⁶* request_instantiation(dr4sChannel¹⁴⁸⁰*, dimeText tag) {
    return _dr4sChannelAcceptorHost.instantiate(tag);
  }
  // ...
private:
  // acceptor-host-members¹⁵⁵⁰...
  dr4sElementAcceptorHost _dr4sElementAcceptorHost;
  dr4sItemAcceptorHost _dr4sItemAcceptorHost;
  dr4sChannelAcceptorHost¹⁴⁸⁶ _dr4sChannelAcceptorHost;
  // ...
private:
  // static-instantiators¹⁵⁵²...
  static dr4sElement¹⁴⁷⁶* dr4sElement_ctor();
  static dr4sElement¹⁴⁷⁶* dr4sItem_ctor() {return new dr4sItem¹⁴⁷⁸;}
  static dr4sElement¹⁴⁷⁶* dr4sChannel_ctor() {return new dr4sChannel¹⁴⁸⁰;}
  // ...
private:
  // instantiator-map-member¹⁵⁵⁴...
  typedef dr4sElement¹⁴⁷⁶* (Ctor)();
  typedef dimeIndex<dimeText, Ctor> CtorMap;
  CtorMap _ctor_map;
};
```

FIG. 69

```
dr4sFactory1542::dr4sFactory()
{
  // instantiator-map-initializers1556...
  _ctor_map["item"] = &dr4sItem_ctor;
  _ctor_map["channel"] = &dr4sChannel_ctor;
}

// instantiators1544 definitions...
dr4sElement1476*
dr4sFactory1542::instantiate(dimeText t)
{
  Ctor *ctor = _ctor_map(t);
  return ctor ? (*ctor)() : 0;
} dr4sElement1476*
dr4sFactory1542::instantiate(dr4sElement1476 *e, dimeText t)
{
  return e->request_instantiation(*this, t);
}
```

*FIG. 70*

```
// resolver1558...
class dishResolver1562 : public dishEditor1564 {
public:
  // build the index...
  bool edit(dishEntity1026 *e) {
    if (!e->id()) return 0;
    if (!_index.insert(e->id(), e)) return 0;
    return 1;
  }
public:
  // operate the index...
  dishEntity1026* resolve(dimeText t) {return _index(t);}
  const dishEntity1026* resolve(dimeText t) const {return _index(t);}
private:
  typedef dimeIndex<dimeText, dishEntity1026> Index;
  Index _index;
};

// depository1560...
class dishPredicatorDepository1566 {
public:
  // accept promissary reference...
  typedef dishPredicatorPromissaryReference Reference;
  void operator<<(Reference *r) {_references << r;}
public:
  // redeem promissary references...
  bool redeem(dishHost1018 &context, dimeLogger *logger) {
    bool ok = 1;
    while (_references) {
      Reference *r = _references.pop();
      if (!r->resolve(context, logger)) ok = 0;
      delete r;
    }
    return ok;
  }
private:
  // member...
  dimePointerSequence<Reference> _references;
};
```

FIG. 71

```
// host^1420...
class dishHost^1018 {
private:
   // client-member-data^1568...
   dishModuleSequence _modules^1020;
   dishModule_dimeTextMap _module_index^1098;
   dishTypeSequence _types^1022;
public:
   // client-member-functions^1570...
   // additional methods...
   dishModule* module(dimeText t);
   dimeBit accept_module(dishModule* m);
   dimeBit accept_type(dishType*);
private:
   // module-member-data^1572...
   dishResolver^1562 _resolver;
   dishPredicatorDepository^1566 _depository;
   dishFactory _factory;
   dishReflector^1578 _reflector;
   mutable dimeLogger *_logger;
public:
   // member-access^1574...
   const dishModuleSequence& modules() const {return _modules;}
   const dishModule_dimeTextMap& module_index() const {return _module_index;}
   const dishTypeSequence& types() const {return _types;}
   const dishResolver& resolver() const {return _resolver;}
   // ...
public:
   // factory^1576...
   dishHost(dimeLogger *l=0);
   virtual ~dishHost();
};
```

FIG. 72

```
// reflector1424...
class dishReflector1578 {
public:
  // factory-services1580...
  dishReflector();
  virtual ~dishReflector();
public:
  // id-services1582...
  dimeText canonical_class_id(dimeText) const;
  bool validate(dimeText) const;
public:
  // set-services1584...
  const dimeTextSet &empty_set() const {return _empty_set;};
  const dimeTextSet &species_set(dimeText) const;
  const dimeTextSet &genera_set(dimeText) const;
  const dimeTextSet &species_closure_set(dimeText) const;
  const dimeTextSet &genera_closure_set(dimeText) const;
  const dimeTextSet &universal_set() const {return _universal_set;};
public:
  // sequence-services1586...
  const dimeTextSequence &empty_sequence() const {return _empty_sequence;};
  const dimeTextSequence &species_sequence(dimeText) const;
  const dimeTextSequence &genera_sequence(dimeText) const;
  const dimeTextSequence &species_closure_sequence(dimeText) const;
  const dimeTextSequence &genera_closure_sequence(dimeText) const;
  const dimeTextSequence &universal_sequence() const {return _universal_sequence;};
private:
  // member-data1588...
  const dimeTextSet _empty_set;
  const dimeTextSequence _empty_sequence;
  typedef dimeMap<dimeText, dimeText> TextMap;
  TextMap _canonical_class_id;
  typedef dimeIndex<dimeText, dimeTextSet> SetIndex;
  SetIndex _species_set, _genera_set;
  SetIndex _species_closure_set, _genera_closure_set;
  typedef dimeIndex<dimeText, dimeTextSequence> SequenceIndex;
  SequenceIndex _species_sequence, _genera_sequence;
  SequenceIndex _species_closure_sequence, _genera_closure_sequence;
  dimeTextSet _universal_set;
  dimeTextSequence _universal_sequence;
};
```

FIG. 73

```
// factory-services1580 excerpts...
dishReflector1578::dishReflector() {
  { // genera...
    { // dishElement1024...
      dimeTextSet *gs = new dimeTextSet;
      _genera_set[dishElement1024::static_class_id()] = gs;
      dimeTextSet *gsc = new dimeTextSet;
      _genera_closure_set[dishElement1024::static_class_id()] = gsc;
      dimeTextSequence *g = new dimeTextSequence;
      _genera_sequence[dishElement1024::static_class_id()] = g;
      dimeTextSequence *gc = new dimeTextSequence;
      _genera_closure_sequence[dishElement1024::static_class_id()] = gc;
      (*gsc) += (*gs);
    }
    { // dishEntity1026...
      dimeTextSet *gs = new dimeTextSet;
      _genera_set[dishEntity1026::static_class_id()] = gs;
      dimeTextSet *gsc = new dimeTextSet;
      _genera_closure_set[dishEntity1026::static_class_id()] = gsc;
      dimeTextSequence *g = new dimeTextSequence;
      _genera_sequence[dishEntity1026::static_class_id()] = g;
      dimeTextSequence *gc = new dimeTextSequence;
      _genera_closure_sequence[dishEntity1026::static_class_id()] = gc;
      gs->put(dishElement1024::static_class_id());
      (*gsc) += genera_closure_set(dishElement1024::static_class_id());
      (*g) << dishElement1024::static_class_id();
      (*gc) << dishElement1024::static_class_id();
      (*gc) << genera_closure_sequence(dishElement1024::static_class_id());
      (*gsc) += (*gs);
    }
    // ...
  }
}
```

FIG. 74

```
// factory-services¹⁵⁸⁰ excerpts...
dishReflector¹⁵⁷⁸::dishReflector() {
  { // species...
    // ...
    { // dishEntity¹⁰²⁶...
      dimeTextSet *ss = new dimeTextSet;
      _species_set[dishEntity¹⁰²⁶::static_class_id()] = ss;
      dimeTextSet *ssc = new dimeTextSet;
      _species_closure_set[dishEntity¹⁰²⁶::static_class_id()] = ssc;
      dimeTextSequence *s = new dimeTextSequence;
      _species_sequence[dishEntity¹⁰²⁶::static_class_id()] = s;
      dimeTextSequence *sc = new dimeTextSequence;
      _species_closure_sequence[dishEntity¹⁰²⁶::static_class_id()] = sc;
      ss->put(dishModule¹⁰²⁸::static_class_id());
      (*ssc) += species_closure_set(dishModule¹⁰²⁸::static_class_id());
      (*s) << dishModule¹⁰²⁸::static_class_id();
      (*sc) << dishModule¹⁰²⁸::static_class_id();
      (*sc) << species_closure_sequence(dishModule¹⁰²⁸::static_class_id());
      ss->put(dishClass¹⁰³⁶::static_class_id());
      (*ssc) += species_closure_set(dishClass¹⁰³⁶::static_class_id());
      (*s) << dishClass¹⁰³⁶::static_class_id();
      (*sc) << dishClass¹⁰³⁶::static_class_id();
      (*sc) << species_closure_sequence(dishClass¹⁰³⁶::static_class_id());
      // ...
    }
    { // dishElement¹⁰²⁴...
      dimeTextSet *ss = new dimeTextSet;
      _species_set[dishElement¹⁰²⁴::static_class_id()] = ss;
      dimeTextSet *ssc = new dimeTextSet;
      _species_closure_set[dishElement¹⁰²⁴::static_class_id()] = ssc;
      dimeTextSequence *s = new dimeTextSequence;
      _species_sequence[dishElement¹⁰²⁴::static_class_id()] = s;
      dimeTextSequence *sc = new dimeTextSequence;
      _species_closure_sequence[dishElement¹⁰²⁴::static_class_id()] = sc;
      ss->put(dishEntity¹⁰²⁶::static_class_id());
      (*ssc) += species_closure_set(dishEntity¹⁰²⁶::static_class_id());
      (*s) << dishEntity¹⁰²⁶::static_class_id();
      (*sc) << dishEntity¹⁰²⁶::static_class_id();
      (*sc) << species_closure_sequence(dishEntity¹⁰²⁶::static_class_id());
      // ...
    }
  }
}
```

FIG. 75

```
// auditor¹⁴²⁸...
class dishAuditor¹⁵⁹⁰ : public dishViewer¹⁵⁹² {
public:
  dishAuditor(dimeLogger *l) : _logger(l) {}
  virtual ~dishAuditor() {}
public:
  // logging-context¹⁵⁹⁴...
  dimeText context(const dishElement *e);
public:
  // views¹⁵⁹⁶...
  virtual bool view(const dishEntity *e) {
    {
      dimeLoggerContext lc(_logger, context(e));
      if (!e->audit(_logger)) return 0;
    }
    return dishViewer¹⁵⁹²::view(e);
  }
  virtual bool view(const dishClass *);
  virtual bool view(const dishMember *);
private:
  mutable dimeLogger *_logger;
};

class dishEntity¹⁰²⁶ : public dishElement¹⁰²⁴ {
private:
  // members...
  dimeText _id;
  // ...
public:
  // audits¹⁵⁹⁸...
  bool audit(dimeLogger *logger) const {
    if (!_id) {
      logger->fail("'_id' failed");
      return 0;
    }
    return 1;
  }
  // ...
};
```

US 7,962,888 B2

PRODUCING UNITARY CLASS DEFINITIONS FROM MODULE SPECIFICATIONS

CROSS-REFERENCE TO RELATED APPLICATIONS

This application claims the benefit of PPA Ser. No. 60/791,128, Module Generation for Object-Oriented Programming, filed Apr. 11, 2006 by the present inventor, the disclosure of which is incorporated herein by reference.

BACKGROUND OF THE INVENTION

This invention relates particularly to the production of module definitions from module specifications, and generally to software development tools generating object-oriented programming language code.

Object-oriented programming enjoys great popularity among programmers. However, in the development of a complex system, the programmer must attend to a vast collection of details. These details may easily obscure and complicate large-scale considerations of the interactions within and between program elements. Hence it would be beneficial to have the use of tools which reduce complexity by automatically handling various details, which may then be suppressed in favor of concise expressions of large-scale interactions.

Object-oriented programming tends to focus on classes, since classes are the most important component in object-oriented programming languages. In many applications, however, significant benefits may be gained by considering modules, which include collections of interrelated classes. Modules typically incorporate classes which are closely related to domain-specific categories. Relationships of generalizations and specialization among domain categories may be reflected in derivation relationships between categorical classes. It would be beneficial for modules to also include non-categorical classes which are specialized for hosting and processing data structures composed of instances from the categorical classes. It would also be beneficial to coordinate and systematize categorical and unitary non-categorical classes to enhance developer productivity, further relieving the developer from excessive attention to tedious details.

The problems of specifying suitable representations have led to enormous efforts in the provision of modeling languages, of which the most prominent may be the Unified Modeling Language. (UML). UML is vast and comprehensive, with a scope that encompasses all aspects of object-oriented programming. The breadth of that scope limits the use of idioms, patterns, and other paradigms that are applicable in a narrower context of specific unitary and categorical classes. It would be beneficial to have methods of processing that were specifically directed to the narrower but still critical problems of the specification, construction, and processing of domain-specific object-oriented data structures.

SUMMARY

A computer-implemented method of processing a module specification to produce predicator definitions is disclosed.

A module is viewed. The module is included in the module specification. A predicator base class definition is provided. The predicator base class definition is included in the predicator definitions. The predicator base class definition includes a plurality of generic predicator apply operations. A promissary reference base class definition is provided. The promissary reference base class definition is included in the predicate definitions. The promissary reference base class definition includes a resolve operation. The promissary reference base class definition includes a plurality of generic promissary acceptor operations.

A plurality of categorical classes are dispatched. The categorical classes are included in the module. A categorical class is viewed. The categorical class is included in the categorical classes. A generic predicator apply operation, corresponding to the categorical class, is accumulated to the generic predicator apply operations. A generic promissary acceptor operation, corresponding to the categorical class, is accumulated to the generic promissary acceptor operations. A promissary dispatch in a categorical class definition, corresponding to the categorical class, is provided. The dispatch in turn dispatches to the generic promissary acceptor operation.

A plurality of class members are dispatched. The class members are included in the categorical class. A datum is viewed. The datum is included in the class members, A view to a datum type is dispatched. The datum type is associated with the datum.

A value type is received. A value predicator specialization is provided, corresponding to the value type for the datum. The value predicator specialization is derived from the predicator base class definition. The value predicator specialization includes a value specific predicator apply operation, corresponding to the generic predicator apply operation. The value predicator specialization is accumulated to a plurality of predicator specializations. The predicator specializations are included in the predicator definitions.

A reference type is received. A meron qualification is tested. The meron qualification is included in the datum. According to the success of the test for the meron qualification, an instantiating predicator specialization is provided, corresponding to the reference type for the datum. The instantiating predicator specialization is derived from the predicator base class definition. The instantiating predicator specialization includes an instantiating specific predicator apply operation, corresponding to the generic predicator apply operation. The instantiating predicator specialization is accumulated to the predicator specializations.

According to the failure of the test for the meron qualification, a promissary predicator specialization, is provided, corresponding to the reference type for the datum. The promissary predicator specialization is derived from the predicator base class definition. The promissary predicator specialization includes a promissary specific predicator apply operation, corresponding to the generic predicator apply operation. The promissary predicator specialization is accumulated to the predicator specializations. A promissary reference definition is written. The promissary reference definition is derived from the promissary reference base class definition. The promissary reference definition includes a specific promissary acceptor operation. The specific promissary acceptor operation corresponds to the generic promissary acceptor operation. The promissary reference definition is accumulated to a plurality of promissary reference definitions. The promissary reference definitions are included in the predicator definitions.

BRIEF DESCRIPTION OF DRAWINGS

FIG. 1 depicts a generator which reads module specifications and writes programming language code and documentation corresponding to the specifications.

FIG. 2 begins the depiction of a summary specification of an exemplary object-oriented module suitable for representation of specifications of object-oriented modules (1/2).

FIG. 3 concludes the depiction of a summary specification of an exemplary object-oriented module suitable for representation of specifications of object-oriented modules (2/2).

FIG. 4 depicts an informal definition of an exemplary class representing a unitary host element for representation of specifications of object-oriented modules.

FIG. 5 depicts an informal definition of an exemplary class representing element elements.

FIG. 6 depicts an informal definition of an exemplary class representing entity elements.

FIG. 7 depicts an informal definition of an exemplary class representing module elements.

FIG. 8 depicts an informal definition of an exemplary class representing class elements.

FIG. 9 depicts an informal definition of an exemplary class representing host-class elements.

FIG. 10 depicts an informal definition of an exemplary class representing operand elements.

FIG. 11 depicts an informal definition of an exemplary class representing argument elements.

FIG. 12 depicts an informal definition of an exemplary class representing member elements.

FIG. 13 depicts an informal definition of an exemplary class representing member-function elements.

FIG. 14 depicts an informal definition of an exemplary class representing member-datum elements.

FIG. 15 depicts an informal definition of an exemplary class representing type elements.

FIG. 16 depicts an informal definition of an exemplary class representing void-type elements.

FIG. 17 depicts an informal definition of an exemplary class representing value-type elements.

FIG. 18 depicts an informal definition of an exemplary class representing bit-type elements.

FIG. 19 depicts an informal definition of an exemplary class representing integer-type elements.

FIG. 20 depicts an informal definition of an exemplary class representing cardinal-type elements.

FIG. 21 depicts an informal definition of an exemplary class representing text-type elements.

FIG. 22 depicts an informal definition of an exemplary class representing reference-type elements.

FIG. 23 depicts an informal definition of an exemplary class representing compound-type elements.

FIG. 24 depicts an informal definition of an exemplary class representing sequence-type elements.

FIG. 25 depicts an informal definition of an exemplary class representing value-sequence-type elements.

FIG. 26 depicts an informal definition of an exemplary class representing reference-sequence-type elements.

FIG. 27 depicts an informal definition of an exemplary class representing set-type elements.

FIG. 28 depicts an informal definition of an exemplary class representing value-set-type elements.

FIG. 29 depicts an informal definition of an exemplary class representing reference-set-type elements.

FIG. 30 depicts an informal definition of an exemplary class representing map-type elements.

FIG. 31 depicts an informal definition of an exemplary class representing index-map-type elements.

FIG. 32 depicts an informal definition of an exemplary class representing scale-map-type elements.

FIG. 33 depicts an informal definition of an exemplary class representing bind-map-type elements.

FIG. 34 depicts an informal definition of an exemplary class representing convert-map-type elements.

FIG. 35 depicts an informal definition of an exemplary class representing logger elements.

FIG. 36 depicts an overview of a module.

FIG. 37 depicts particulars of a module.

FIG. 38 depicts a generated class definition for a class.

FIG. 39 depicts a generated view dispatch member function for a class.

FIG. 40 depicts a generated host class definition for a module.

FIG. 41 depicts a generated viewer class definition for a module.

FIG. 42 depicts generated member function definitions for the viewer class for a module.

FIG. 43 depicts a generated factory class definition for a module.

FIG. 44 depicts a builder class definition for an application.

FIG. 45 depicts member function definitions for a builder class for a application.

FIG. 46 depicts a page class definition for an application.

FIG. 47 depicts an HTML writer class definition for an application.

FIG. 48 depicts member function definitions for an HTML writer class for an application.

FIG. 49 depicts additional member function definitions for an HTML writer class for an application.

FIG. 50 depicts a main program for an application.

FIG. 52 depicts excerpts from generated forward class declarations for an exemplary module, generated by a forwards-writer generator.

FIG. 53 depicts excerpts from generated class definitions for an exemplary module, generated by a classes-writer generator.

FIG. 54 depicts excerpts from a generated viewer class for an exemplary module, generated by a viewer-writer generator.

FIG. 55 depicts excerpts from member definitions of a generated viewer class for an exemplary module, generated by a viewer-writer generator.

FIG. 56 depicts excerpts from a module specification for an exemplary module.

FIG. 57 depicts excerpts from a generated acceptor class definition for an exemplary module, generated by an acceptors-writer generator.

FIG. 58 depicts excerpts from generated member function definitions for a generated acceptor class for an exemplary module, generated by an acceptors-writer generator.

FIG. 59 depicts excerpts from a generated class definition of an acceptor class specialization, generated by an acceptors-writer generator.

FIG. 60 depicts excerpts from a generated class definition of an acceptor host class specialization, generated by an acceptors-writer generator.

FIG. 61 depicts excerpts from generated member function definitions for a generateed acceptor host class specialization, generated by an acceptors-writer generator.

FIG. 62 depicts excerpts from generated class definitions for classes from an exemplary module, including dispatch to an acceptor.

FIG. 63 depicts an accept-element member function suitable for markup processing.

FIG. 64 depicts excerpts from generated class definitions for predicator classes for processing predicates, generated by an predicators-writer generator.

FIG. 65 depicts excerpts from generated class definitions for specializations of predicators.

FIG. 66 depicts excerpts from a generated promissary reference class, for deferred resolution of textual identiers.

FIG. 67 depicts excerpts from generated classes illustrating dispatch to a promissary reference, acceptance of a promissary reference, and construction of a promissary reference in an predicator.

FIG. 68 depicts excerpts from a generated factory class definition including acceptor-hosts, generated by a factory-writer generator.

FIG. 69 depicts excerpts from generated member functions from a factory class, generated by a factory-writer generator.

FIG. 70 depicts excerpts from generated class definitions for a resolver and a depository, generated by a host-writer generator.

FIG. 71 depicts excerpts from generated class definitions for a host, generated by a host-writer generator.

FIG. 72 depicts excerpts from a generated class definition for a reflector, generated by a reflector-writer generator.

FIG. 73 depicts excerpts from a generated initialization for a reflector, generated by a reflector-writer generator.

FIG. 74 depicts additional excerpts from a generated initialization for a reflector, generated by a reflector-writer generator.

FIG. 75 depicts excerpts from a generated class definition for an auditor, generated by an auditor-writer generator.

DETAILED DESCRIPTION

1 Terminology

Figure 51:
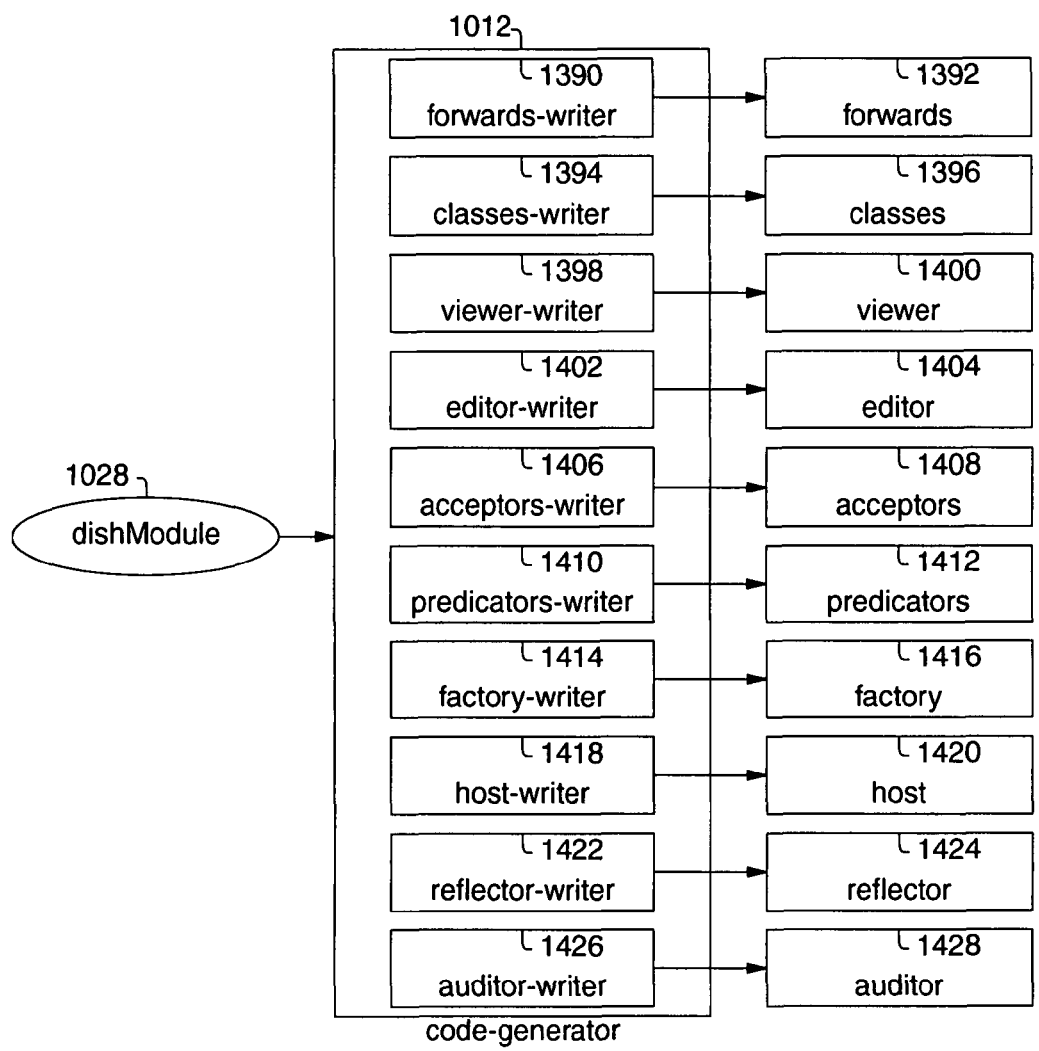
FIG. 51 depicts a summary of the code generators.

The present invention concerns the generation of module definitions from module specifications. For the purposes of this invention, a module definition is a collection of interrelated object-oriented class definitions and other elements of an object-oriented computer program. A module specification is an object-oriented data structure typically derived from a textual expression prepared by a human programmer or a computer program. The module specification represents the classes and other elements that will be defined in the module definition.

Classes may be usefully divided into categorical classes and unitary classes. A categorical class corresponds to a category in a domain-specific model. Thus categorical classes are largely determined by the requirements of the domain to which applications of the specified module are directed. Instances of a categorical class are typically unbounded in number. Categorical classes are usually arranged in a hierarchy or directed acyclic graph reflecting the relations of genera and species among the domain-specific categories.

Unitary classes relate to the module as a whole. A host is one important unitary class. The host for a module provides a unitary representation of what is typically a multiplicity of objects. The objects are instances of the categorical classes. The host provides access to individual and collected instances according to an organizational scheme which reflects the requirements of the domain. Together with the categorical instances, the host provides a domain-specific object-oriented data structure which is convenient as a target for construction and as a source for processing.

The categorical classes of a module, corresponding to the categories of a domain, are characterized by member data. The form of the member data is specified in the class but each instance has its own copy of member data elements. Member data is characterized by its type. Type is a complex property of data in many object-oriented programming languages. In the present invention, a simplified type system is used, permitting concise specification and enforcing consistency of usage. Types include value types, reference types, and compound types.

Value types correspond to scalar data, in which the value of the data accords with the meaning of the data. Scalar data is typically represented by built-in types of a programming language (e.g. int, double, char, in the C language) or by simple classes (e.g. string, date) which may be passed by value (copying elements or structures). Scalar data is used to represent properties of instances, such as identifiers and measured quantities.

Reference types correspond to references to instances of categories. Reference data is typically represented by pointers or references in a programming language. The value of a pointer is arbitrary and bears no relation to the meaning of the object the pointer represents. Reference data is typically passed by reference (i.e. by copying pointers, not structures). Conceptually, reference data is used to implement assocations among categories in which a first instance is associated with a second instance.

Compound types correspond to collections. Provision of collections varies widely in programming languages. However, for effective application programming, set, sequence, and map may be sufficient. A set is an unordered collection of elements which does not contain duplicates. A set provides efficient determination of the presence or absence of an element. A set also provide efficient insertion and deletion of an element. Efficient iteration of the constituent elements of a set is another requirement. Efficient in this context means logarithmic in the number of contained elements for determination, insertion, and deletion. Sets may contain reference or value data.

A sequence is an ordered collection which provides efficient insertion and deletion of elements at either end of the sequence, thus permitting stack, queue, and deque functionality. A sequence may also provide efficient random access to individual elements by offset in the collection order. A sequence also provides efficient iteration of the elements in order. Sequences may contain reference or value data.

A map provides efficient association between domain and range elements. Given a domain element, a map efficiently produces a corresponding range element or indicates the absence of such an element. Maps must efficiently support insertion and deletion of domain, range pairs. Maps support all combinations of range and domain value and reference. An index denotes a map with a value domain and a reference range. A scale denotes a map with a reference domain and a value range. A binding denotes a map with reference domain and range. A conversion denotes a map with value domain and range.

Member data having singular or compound reference type may be characterized by a meron qualification. Qualification as a meron indicates that the referenced element should be considered a part of the referencing element. The term is a contraction of the linguistic term "meronym", which is used to distinguish a part in a part/whole relationship. Used in a module specification, meron qualification determines memory management, where applicable, as well as default behavior in the base viewer and the base editor. In the default view of an instance, its merons will be viewed. Non-meron references are ignored by default.

2 System Overview

Refer to FIG. 1. A generator 1000 processes module specifications compatible with a grammar 1002 to produce generated-code 1004 and generated-documents 1006. The specifications are processed by a parser 1008, which constructs an object-oriented data structure encapsulated in a host 1010. The host 1010 represents the specified modules as an object-oriented data structure. The constituent module specifications of the host 1010 are processed by a code-generator 1012 to provide the generated-code 1004. The generated code includes software components written in a conventional object-oriented programming language. The constituent module specifications of the host 1010 are also processed by a document-generator 1014 to provide the generated-documents 1006. The generated documentation includes descriptions and figures which characterize the specified modules.

The present invention relates to aspects of the processing of the constituent module specifications of the host 1010 by the code-generator 1012 and the document-generator 1014 to produce the generated-code 1004 and the generated-documents 1006. Co-pending applications relate to the language of the grammar 1002 the parser 1008, and other aspects of the code-generator 1012.

3 Meta-Module Description

Refer to FIG. 2. A discursive-model meta-module 1016 specifies classes for representation and processing of modules for object-oriented programming. The meta-module 1016 has a host class host 1018.

The host 1018 represents an instantiation of the module. A datum modules 1020 collects module specifications. A datum types 1022 collects types defined amongst modules for memory management.

A categorical class element 1024 defines a common base for parsed elements.

A categorical class entity 1026 represents named elements. The entity 1026 has genus element 1024.

A categorical class module 1028 represents a collection of interrelated classes for object-oriented programming. The module 1028 has genus entity 1026. A datum classes 1030 represents the collection of classes within a module. A datum forward-classes 1032 represents related classes which are used within a particular module but are not defined in the module. A datum host 1034 represents a class, an instance of which encapsulates an application-specific object-oriented data structure corresponding to an instantiation of a module.

A categorical class class 1036 represents a class for object-oriented programming. The class 1036 has genus entity 1026. A datum members 1038 represents the members of a particular class.

A categorical class host-class 1040 represents an instantiation of a module. The host-class 1040 has genus class 1036.

A categorical class operand 1042 represents a typed entity in a scope. The operand 1042 has genus entity 1026.

A categorical class argument 1044 represents an argument to a member function. The argument 1044 has genus operand 1042.

A categorical class member 1046 represents a member in a class. The member 1046 has genus operand 1042.

A categorical class member-function 1048 represents a member function in a class. The member-function 1048 has genus member 1046. A datum arguments 1050 specifies the arguments to a member function.

A categorical class member-datum 1052 represents a member datum in a class. The member-datum 1052 has genus member 1046.

Refer to FIG. 3. A categorical class type 1054 characterizes the typing of an operand. The type 1054 has genus element 1024.

A categorical class void-type 1056 characterizes the absence of a type. The void-type 1056 has genus type 1054.

A categorical class value-type 1058 characterizes a type which is passed by value. The value-type 1058 has genus type 1054.

A categorical class bit-type 1060 represents a Boolean value, true or false. The bit-type 1060 has genus value-type 1058.

A categorical class integer-type 1062 represents an integral value. The integer-type 1062 has genus value-type 1058.

A categorical class cardinal-type 1064 represents a non-negative integral value. The cardinal-type 1064 has genus value-type 1058.

A categorical class text-type 1066 represents a textual value. The text-type 1066 has genus value-type 1058.

A categorical class reference-type 1068 characterizes a type which is passed by reference. The reference-type 1068 has genus type 1054.

A categorical class compound-type 1070 characterizes a type which corresponds to a collection. The compound-type 1070 has genus type 1054.

A categorical class sequence-type 1072 characterizes a sequence of elements. The sequence-type 1072 has genus compound-type 1070.

A categorical class value-sequence-type 1074 characterizes a sequence of value-typed elements. The value-sequence-type 1074 has genus sequence-type 1072.

A categorical class reference-sequence-type 1076 characterizes a sequence of reference-typed elements. The reference-sequence-type 1076 has genus sequence-type 1072.

A categorical class set-type 1078 characterizes a set of elements. The set-type 1078 has genus compound-type 1070.

A categorical class value-set-type 1080 characterizes a set of value-typed elements. The value-set-type 1080 has genus set-type 1078.

A categorical class reference-set-type 1082 characterizes a set of reference-typed elements. The reference-set-type 1082 has genus set-type 1078.

A categorical class map-type 1084 characterizes a map associating pairs of elements. The map-type 1084 has genus compound-type 1070.

A categorical class index-map-type 1086 characterizes a map, of which the range elements are of reference type and the domain elements are of value type. The index-map-type 1086 has genus map-type 1084.

A categorical class scale-map-type 1088 characterizes a map, of which the range elements are of value type and the domain elements are of reference type. The scale-map-type 1088 has genus map-type 1084.

A categorical class bind-map-type 1090 characterizes a map, of which both the range and domain elements are of reference type. The bind-map-type 1090 has genus map-type 1084.

A categorical class convert-map-type 1092 characterizes a map, of which both the range and domain elements are of value type. The convert-map-type 1092 has genus map-type 1084.

A categorical class logger 1094 provides logging services.

3.1 Host Class

Refer to FIG. 4. The host 1018 represents an instantiation of the module. The modules 1020 collects module specifications. The modules 1020 ranges over instances of the class module 1028. The modules 1020 is a meron. A method module 1096 maps module identifiers to module specifications. A datum module-index 1098 maps module identifiers to module specifications. The module-index 1698 ranges over instances of the class module 1028. A method accept-module 1100 accepts a module specification. The types 1022 collects types defined amongst modules for memory management. The types 1022 ranges over instances of the class type 1054. The types 1022 is a meron. A method accept-type 1102 accepts a supplied type instance for accumulation in types 1022. The accept-type 1102 always accepts the supplied type.

3.2 Element Categorical Class

Refer to FIG. 5. The element 1024 defines a common base for parsed elements. The element 1024 is a root-level class of the meta-module 1016. A datum source 1104 identifies the source file and line from which the element was parsed. The source 1104 is useful for reporting errors. The source 1104 ranges over scalar text.

3.3 Entity Categorical Class

Refer to FIG. 6. The entity 1026 represents named elements. The entity 1026 has genus element 1024. A datum id 1106 uniquely identifies a particular entity in a global scope. The id 1106 is required. The id 1106 ranges over scalar text. A datum term 1108 provides a text-friendly identifier, not necessarily unique. The term 1108 is used in the generated particulars of an entity. The term 1108 is required. The term 1108 ranges over scalar text. A datum title 1110 provides a text-friendly phrase, suitable for heading a section or figure. The title 1110 ranges over scalar text. The title 1110 is currently ignored except for module and class. A datum purpose 1112 describes the purpose of a particular entity. The purpose 1112 should be a predicate corresponding to the entity as a subject. The purpose 1112 ranges over scalar text. A datum passage 1114 indicates the segment in which to present a particular entity. The passage 1114 ranges over scalar text. The passage 1114 should be restricted to the class 1036 and the module 1028. A datum remarks 1116 provides primary supplemental descriptive information pertaining to a particular entity. The remarks 1116 should be a predicate corresponding to the entity as a subject. The remarks 1116 are presented at the beginning of the generated particulars of a particular entity. The remarks 1116 ranges over scalar text. A datum notes 1118 provides secondary supplemental descriptive information pertaining to a particular entity. The notes 1118 should be a predicate corresponding to the entity as a subject. The notes 1118 are presented at the end of the generated particulars of a particular entity. The notes 1118 ranges over scalar text.

3.4 Module Categorical Class

Refer to FIG. 7. The module 1028 represents a collection of interrelated classes for object-oriented programming. The module 1028 has genus entity 1026. The classes 1030 represents the collection of classes within a module. The classes 1030 ranges over instances of the class class 1036. The classes 1030 is a meron. A datum class-index 1120 associates a particular class 1036 with its unique id 1106. The class-index 1120 ranges over instances of the class class 1036. A method accept-class 1122 accepts an instance of the class 1036 as a constituent of a module. The accept-class 1122 updates the classes 1030 and the class-index 1120. The accept-class 1122 fails on duplicate id 1106. A method resolve-class 1124 resolves a textual identifier to an instance of the class 1036 which is a constituent of a module. The resolve-class 1124 uses the class-index 1120. A method sort-classes 1126 performs topological sort of module classes to ensure that no class is defined before its genera. The forward-classes 1032 represents related classes which are used within a particular module but are not defined in the module. The forward-classes 1032 ranges over instances of the class class 1036. The forward-classes 1032 is a meron. A method accept-forward-class 1128 accepts an instance of the class 1036 as a forward class definition. The accept-forward-class 1128 updates the forward-classes 1130 and the class-index 1120. The accept-forward-class 1128 assumes memory management of the supplied class. A datum root-classes 1132 represents the collection of classes with a module which do not have any generalizations within the module. The root-classes 1132 is a subset of the classes 1030. The root-classes 1132 ranges over instances of the class class 1036. The host 1034 represents a class, an instance of which encapsulates an application-specific object-oriented data structure corresponding to an instantiation of a module. The host 1034 is the target for module-scoped member specifications. The host 1034 instance may be denoted as a model object or a document object. The host 1034 may contain resolver, depository, factory, reflector, etc. according to specification. The host 1034 ranges over instances of the class host-class 1040. The host 1034 is a meron. A method accept-host 1134 accepts an instance of the host-class 1040 for assignment to the host 1034. The accept-host 1134 fails if the host class instance is already defined. A datum viewer-id 1136 specifies a view operator to be generated; the generated viewer provides a useful base class for read-only operators that process an instantiation of a module. The viewer-id 1136 ranges over scalar text. A datum editor-id 1138 specifies an edit operator to be generated; the generated editor provides a useful base class for write-capable operators that process an instantiation of a module. The editor-id 1138 ranges over scalar text. A datum factory-id 1140 specifies a factory operator to be generated; the generated factory provides text-driven instantiation of objects from the classes of a module. The factory-id 1140 is particularly useful for processing markup. The factory-id 1140 ranges over scalar text. A datum factory-root-id 1142 specifies the base class from which factory-generated classes must derive; cf. the factory-id 1140. The factory-root-id 1142 ranges over scalar text. A datum auditor-id 1144 specifies an auditor operator to be generated; the generated auditor determines conformance with specified requirements. The auditor-id 1144 ranges over scalar text. A datum reflector-id 1146 specifies a reflector operator to be generated; the generated reflector provides a run-time representation of the specialization and generalization relationships of the classes of a module. The reflector-id 1146 ranges over scalar text. A datum parser-id 1148 specifies an external parser class, for which lexical responders shall be generated to facilitate generic processing of assignments from predicates. The parser-id 1148 ranges over scalar text. A datum resolver-id 1150 specifies a resolver operator to be generated; the generated resolver provides resolution of identifiers to instances. The resolver-id 1150 uses the member specified by the resolver-id-field 1152 of the class specified by the resolver-root-id 1154. The resolver-id 1150 resolves identifiers to instances of the class specified by the resolver-root-id 1154. The resolver-id 1150 ranges over scalar text. The resolver-id 1150 specializes the editor operator specified by the editor-id 1138. A datum resolver-root-id 1154 specifies the common base class for resolution. The resolver-root-id 1154 must have a member datum or function corresponding to the resolver-id-field 1152. The resolver-root-id 1154 ranges over scalar text. A datum resolver-id-field 1152 specifies the member of the class specified by the resolver-root-id 1154 which uniquely identifies instances of the class specified by the resolver-root-id 1154. The resolver-id-field 1152 is used by the generated resolver. The resolver-id-field 1152 must be a member datum or member function of the class specified by the resolver-root-id 1154. The resolver-id-field 1152 ranges over scalar text. A datum acceptor-id 1156 specifies an acceptor class to be generated; the generated acceptor serves as a genus class for specific acceptor classes, also to be generated.

The acceptor-id 1156 is particularly useful for parsing and processing markup. The acceptor-id 1156 ranges over scalar text. A datum predicator-id 1158 specifies a predicator class to be generated; the generated predicator serves as a genus class for specific predicator classes, also to be generated. The predicator-id 1158 is particularly useful for parsing and processing markup. The predicator-id 1158 ranges over scalar text. A method qualifier-id 1160 specifies a qualifer class, specializing the predicator, to be generated. A method singleton-id 1162 specifies a singleton class, specializing the predicator, to be generated. A method plurality-id 1164 specifies a plurality class, specializing the predicator, to be generated. A method predicator-sequence-id 1166 specifies a class providing a sequence of predicators, to be generated. A method promissary-reference-id 1168 specifies a class providing a deferred resolution of a textual reference. A method depository-id 1170 specifies a depository class, holding promissary references for eventual redemption. A datum predicator-host-id 1172 specifies a predicator host class to be generated; the generated predicator host serves predicators corresponding to predicates. The predicator-host-id 1172 is particularly useful for processing markup. The predicator-host-id 1172 ranges over scalar text.

3.5 Class Categorical Class

Refer to FIG. 8. The class 1036 represents a class for object-oriented programming. The class 1036 has genus entity 1026. A datum module 1174 represents a particular instance of the module 1028 of which a particular class is a constituent. The module 1174 is complementary to the classes 1030. The module 1174 ranges over instances of the class module 1028. A datum genera 1176 represents the collection of classes from which a particular class is derived. The genera 1176 includes the closest generalizations of a particular class. The genera 1176 ranges over instances of the class class 1036. The members 1038 represents the members of a particular class. The members 1038 may include data members and function members. The members 1038 ranges over instances of the class member 1046. The members 1038 is a meron. A datum member-index 1178 associates members with their scoped identifiers. The member-index 1178 ranges over instances of the class member 1046. A datum species 1180 represents the collection of classes which are derived from a particular class. The species 1180 are the closest specializations of a particular class. The species 1180 are useful for depth-first processing of classes in a module; cf. the root-classes 1132. The species 1180 is complementary to the genera 1176. The species 1180 ranges over instances of the class class 1036. A datum genera-closure 1182 represents the totality of classes in the ancestry of a class. The genera-closure 1182 includes all the generalizations of a particular class. The genera-closure 1182 ranges over instances of the class class 1036. A datum species-closure 1184 represents the totality of classes descending from a class. The species-closure 1184 includes all the specializations of a particular class. The species-closure 1184 is complementary to the genera-closure 1182. The species-closure 1184 ranges over instances of the class class 1036. A datum is-module-root 1186 indicates whether a particular class lacks any generalizations in its containing module 1028. The is-module-root 1186 corresponds to membership in the root-classes 1132. The is-module-root 1186 ranges over scalar boolean. A datum constructs-markup-element 1188 indicates responsiveness to element construction in processing markup. The constructs-markup-element 1188 is applicable to the host only. The constructs-markup-element 1188 ranges over scalar boolean. A datum accepts-markup-element 1190 indicates responsiveness to elements in processing markup. The accepts-markup-element 1190 ranges over scalar boolean. A datum accepts-markup-text 1192 indicates responsiveness to text in processing markup. The accepts-markup-text 1192 ranges over scalar boolean. A datum accepts-markup-predicate 1194 indicates responsiveness to predicates in processing markup. The accepts-markup-predicate 1194 ranges over scalar boolean. A datum markup-configure 1196 indicates responsiveness to element configuration in processing markup. The markup-configure 1196 ranges over scalar boolean. A datum markup-commit 1198 indicates responsiveness to element commitment in processing markup. The markup-commit 1198 ranges over scalar boolean. A datum is-pure-abstract 1200 indicates whether class is not instantiable due to pure member functions. The is-pure-abstract 1200 is computed at module instantiation; do not set. The is-pure-abstract 1200 ranges over scalar boolean. A method accept-member 1202 accumulates a member. The accept-member 1202 updates the members 1038 and the member-index 1178. The accept-member 1202 fails on duplicate scoped identifiers for members. A datum provides-downcast 1204 specifies the provision of a safe downcast to immediate species of a class. The provides-downcast 1204 is occasionally useful but easily abused; beware. The provides-downcast 1204 ranges over scalar boolean. A datum tags 1206 indicates generic textual identifiers usable for instantiation of a particular class. The tags 1206 are especially useful for parsing text and processing markup. The tags 1206 ranges over scalar text. A method acceptor-host-id 1208 specifies a class which maps tags to acceptors. A datum audit-requirements 1210 specifies boolean conditions that may be verified by a generated auditor as specified by the auditor-id 1212. The audit-requirements 1210 ranges over scalar text. A datum auditor-context 1214 supplies reporting context for auditor. The auditor-context 1214 must evaluate to an instance of text. The auditor-context 1214 ranges over scalar text.

3.6 Host Class Categorical Class

Refer to FIG. 9. The host-class 1040 represents an instantiation of a module. The host-class 1040 represents the totality of an application-specific object-oriented data structure. The host-class 1040 corresponds to the host 1034. The host-class 1040 typically occurs in a singleton instance per application. The host-class 1040 provides a useful target for parsing, markup, etc. The host-class 1040 has genus class 1036.

3.7 Operand Categorical Class

Refer to FIG. 10. The operand 1042 represents a typed entity in a scope. The operand 1042 has genus entity 1026. A datum scope-handle 1216 informally identifies an operand in a scope. The scope-handle 1216 ranges over scalar text. A method validate-handle 1218 ensures that a proposed handle does not conflict with C++ reserved words. A method accept-scope-handle 1220 provides an acceptor for the scope-handle 1216. A datum scope-id 1222 uniquely identifies an operand in a scope. The scope-id 1222 is applicable to members in a class scope and arguments in a member function scope. The scope-id 1222 ranges over scalar text. A datum is-const 1224 indicates whether the operand may be modified in the scope. The is-const 1224 ranges over scalar boolean. A datum type 1226 specifies the type of an operand. The type 1226 ranges over instances of the class type 1054.

3.8 Argument Categorical Class

Refer to FIG. 11. The argument 1044 represents an argument to a member function. The argument 1044 has genus operand 1042. A datum position 1228 indicates the position of the argument in the member function argument sequence. The position 1228 ranges over scalar cardinal. A datum arg-default 1230 indicates a default value for the argument. The arg-default 1230 ranges over scalar text.

3.9 Member Categorical Class

Refer to FIG. 12. The member 1046 represents a member in a class. The member 1046 has genus operand 1042. A datum member-class 1232 identifies the class which specifies the member. The member-class 1232 ranges over instances of the class class 1036.

3.10 Member Function Categorical Class

Refer to FIG. 13. The member-function 1048 represents a member function in a class. The member-function 1048 has genus member 1046. A datum is-static 1234 indicates a class function. The is-static 1234 is invoked independently of any instance of the class. The is-static 1234 ranges over scalar boolean. A datum is-virtual 1236 indicates a virtual member function. The is-virtual 1236 ranges over scalar boolean. A datum is-pure 1238 indicates a pure virtual member function. The is-pure 1238 implies is-virtual 1236, but not vice versa. The is-pure 1238 precludes instantiation of the containing class when set. The is-pure 1238 ranges over scalar boolean. The arguments 1050 specifies the arguments to a member function. The arguments 1050 ranges over instances of the class argument 1044. The arguments 1050 is a meron. A datum inline-definition 1240 specifies the inline definition of a member function. The inline-definition 1240 ranges over scalar text. A datum definition 1242 specifies the definition of a member function. The definition 1242 precludes the inline definition of a member function. The definition 1242 ranges over scalar text. A datum indicates 1244 describes the meaning of the return value of a member function. The indicates 1244 should be a complement to "The member returns a [type], indicating . . . ". The indicates 1244 ranges over scalar text.

3.11 Member Datum Categorical Class

Refer to FIG. 14. The member-datum 1052 represents a member datum in a class. The member-datum 1052 has genus member 1046. A datum is-meron 1246 indicates that a member datum is a meronym of the containing instance of the class to which it belongs. The is-meron 1246 indicates that the member datum is to be deleted on deletion of the containing instance. The is-meron 1246 indicates that, by default, viewers and editors of the module should recursively visit the member datum when visiting the containing instance. The is-meron 1246 ranges over scalar boolean. A datum is-mutable 1248 indicates that non-const access to a member datum is provided even when the containing instance is const. The is-mutable 1248 ranges over scalar boolean. A datum init 1250 indicates an initial value for the datum at instantiation. The init 1250 ranges over scalar text. A method predicator-class-id 1252 specifies an identifier for a predicator class which will mediate transformation from a textual representation to a type-safe object-oriented element. The predicator-class-id 1252 identifies a class which is applicable for direct processing of scalars and meron references in predicates and attributes; a promissary reference is used to process non-meron references. A method promissary-class-id 1254 specifies an identifier for a promissary class which will mediate deferred transformation from a textual reference to a type-safe object-oriented element. The promissary-class-id 1254 identifies a class which is applicable for processing non-meron references in predicates and attributes. A method acceptor-class-id 1256 specifies an identifier for an acceptor class which will receive and assign instances. The acceptor-class-id 1256 identifies a class which is applicable for processing contained markup elements. A method generic-acceptor-id 1258 specifies an identifier for a member function which provides a uniform acceptance interface (assignment or accumulation) for elements of the proper type. The generic-acceptor-id 1258 identifies a member function which is required by acceptors and predicators. A datum acceptor 1260 specifies a member function to which assignment or accumulation of the datum is restricted. The acceptor 1260 ranges over instances of the class member-function 1048. The acceptor 1260 should indicate a member function which returns a boolean indicating the success of the attempted assignment. A datum inhibit-predicator 1262 prevents automatic generation of a predicator for use in parsing and processing markup. The inhibit-predicator 1262 typically used with an accepter where the underlying member datum is a secondary target, e.g. an index associated with a sequence. The inhibit-predicator 1262 ranges over scalar boolean. A datum tags 1264 specifies textual identifiers usable for instantiation of a particular class and subsequently for assignment to a particular member. The tags 1264 are especially useful for parsing text and processing markup. The tags 1264 ranges over scalar text. A datum handles 1266 permit scope-specific alternative identification. The handles 1266 must be unique in scope. The handles 1266 are used as identifiers in the generation of convenience member functions. The handles 1266 ranges over scalar text. A method accept-handle 1268 validates and accepts the supplied handle.

3.12 Type Categorical Class

Refer to FIG. 15. The type 1054 characterizes the typing of an operand. The type 1054 has genus element 1024. A method type-text 1270 provides a textual representation of a type. A method is-plural 1272 distinguishes plural from singleton types. The is-plural 1272 is false, by default; non-compound types are singular.

3.13 Void Type Categorical Class

Refer to FIG. 16. The void-type 1056 characterizes the absence of a type. The void-type 1056 has genus type 1054. A method type-text 1274 returns "Void".

3.14 Value Type Categorical Class

Refer to FIG. 17. The value-type 1058 characterizes a type which is passed by value. The value-type 1058 has genus type 1054.

3.15 Bit Type Categorical Class

Refer to FIG. 18. The bit-type 1060 represents a Boolean value, true or false. The bit-type 1060 has genus value-type 1058. A method type-text 1276 returns "Bit".

3.16 Integer Type Categorical Class

Refer to FIG. 19. The integer-type 1062 represents an integral value. The integer-type 1062 has genus value-type 1058. A method type-text 1278 returns "Integer".

3.17 Cardinal Type Categorical Class

Refer to FIG. 20. The cardinal-type 1064 represents a non-negative integral value. The cardinal-type 1064 useful for counting. The cardinal-type 1064 has genus value-type 1058. A method type-text 1280 returns "Cardinal".

3.18 Text Type Categorical Class

Refer to FIG. 21. The text-type 1066 represents a textual value. The text-type 1066 has genus value-type 1058. A method type-text 1282 returns "Text".

3.19 Reference Type Categorical Class

Refer to FIG. 22. The reference-type 1068 characterizes a type which is passed by reference. The reference-type 1068 corresponds to a class. The reference-type 1068 has genus type 1054. A datum reference-class-id 1284 identifies the class to which a reference type corresponds. The reference-class-id 1284 ranges over scalar text. A method type-text 1286 returns the reference-class-id 1284.

3.20 Compound Type Categorical Class

Refer to FIG. 23. The compound-type 1070 characterizes a type which corresponds to a collection. The compound-type 1070 is parameterized by one or more subsidiary types. The compound-type 1070 has genus type 1054. A datum parameters 1288 specifies the subsidiary types by which a compound type is parameterized. The parameters 1288 ranges over instances of the class type 1054. A method type-text 1290 has unspecified purpose. A method compound-text 1292 specifies the particular compound, e.g. sequence, set, etc. A method is-plural 1294 has unspecified purpose. The is-plural 1294 is true, by default; compound types are plural. A datum range 1296 specifies the characteristic subsidiary type of the elements in the compound type. The range 1296 ranges over instances of the class type 1054.

3.21 Sequence Type Categorical Class

Refer to FIG. 24. The sequence-type 1072 characterizes a sequence of elements. The sequence-type 1072 specifies a compound element that permits efficient addition or removal of elements at the front or back of the sequence. The sequence-type 1072 specifies a compound element that permits direct access to elements by position in the sequence. The sequence-type 1072 specifies a compound element that permits iteration of the elements in the sequence. The sequence-type 1072 has genus compound-type 1070. A method compound-text 1298 has unspecified purpose. The compound-text 1298 returns "Sequence".

3.22 Value Sequence Type Categorical Class

Refer to FIG. 25. The value-sequence-type 1074 characterizes a sequence of value-typed elements. The value-sequence-type 1074 has genus sequence-type 1072. A datum value-range 1300 specifies the value type of the sequence elements. The value-range 1300 ranges over instances of the class value-type 1058.

3.23 Reference Sequence Type Categorical Class

Refer to FIG. 26. The reference-sequence-type 1076 characterizes a sequence of reference-typed elements. The reference-sequence-type 1076 has genus sequence-type 1072. A datum reference-range 1302 specifies the reference type of the sequence elements. The reference-range 1302 ranges over instances of the class reference-type 1068.

3.24 Set Type Categorical Class

Refer to FIG. 27. The set-type 1078 characterizes a set of elements. The set-type 1078 specifies a compound element that permits efficient determination of the presence or absence of a particular element in the set. The set-type 1078 specifies a compound element that permits iteration of elements in the set. The set-type 1078 has genus compound-type 1070. A method compound-text 1304 has unspecified purpose. The compound-text 1304 returns "Set".

3.25 Value Set Type Categorical Class

Refer to FIG. 28. The value-set-type 1080 characterizes a set of value-typed elements. The value-set-type 1080 has genus set-type 1078. A datum value-range 1306 specifies the value type of the set elements. The value-range 1306 ranges over instances of the class value-type 1058.

3.26 Reference Set Type Categorical Class

Refer to FIG. 29. The reference-set-type 1082 characterizes a set of reference-typed elements. The reference-set-type 1082 has genus set-type 1078. A datum reference-range 1308 specifies the reference type of the set elements. The reference-range 1308 ranges over instances of the class reference-type 1068.

3.27 Map Type Categorical Class

Refer to FIG. 30. The map-type 1084 characterizes a map associating pairs of elements. The map-type 1084 specifies a compound element that permits association of a range element with a supplied domain element. The map-type 1084 specifies a compound element that permits iteration of pairs. The map-type 1084 has genus compound-type 1070. A datum domain 1310 specifies the subsidiary type of the domain elements. The domain 1310 ranges over instances of the class type 1054. A method compound-text 1312 has unspecified purpose. The compound-text 1312 returns "Map".

3.28 Index Map Type Categorical Class

Refer to FIG. 31. The index-map-type 1086 characterizes a map, of which the range elements are of reference type and the domain elements are of value type. The index-map-type 1086 has genus map-type 1084. A datum value-domain 1314 specifies the value type of the map domain. The value-domain 1314 ranges over instances of the class value-type 1058. A datum reference-range 1316 specifies the reference type of the map range. The reference-range 1316 ranges over instances of the class reference-type 1068.

3.29 Scale Map Type Categorical Class

Refer to FIG. 32. The scale-map-type 1088 characterizes a map, of which the range elements are of value type and the domain elements are of reference type. The scale-map-type 1088 has genus map-type 1084. A datum reference-domain 1318 specifies the reference type of the map domain. The reference-domain 1318 ranges over instances of the class reference-type 1068. A datum value-range 1320 specifies the value type of the map range. The value-range 1320 ranges over instances of the class value-type 1058.

3.30 Bind Map Type Categorical Class

Refer to FIG. 33. The bind-map-type 1090 characterizes a map, of which both the range and domain elements are of reference type. The bind-map-type 1090 has genus map-type 1084. A datum reference-domain 1322 specifies the reference type of the map domain. The reference-domain 1322 ranges over instances of the class reference-type 1068. A datum reference-range 1324 specifies the reference type of the map range. The reference-range 1324 ranges over instances of the class reference-type 1068.

3.31 Convert Map Type Categorical Class

Refer to FIG. 34. The convert-map-type 1092 characterizes a map, of which both the range and domain elements are of value type. The convert-map-type 1092 has genus map-type 1084. A datum value-domain 1326 specifies the value type of the map domain. The value-domain 1326 ranges over instances of the class value-type 1058. A datum value-range 1328 specifies the value type of the map range. The value-range 1328 ranges over instances of the class value-type 1058.

3.32 Logger Categorical Class

Refer to FIG. 35. The logger 1094 provides logging services. The logger 1094 is a root-level class of the meta-module 1016.

4 Media Scanner

A simple application demonstrates the use of the module generator. The demonstration application recursively scans one or more file-system directories looking for media files. The media files which are detected are presented in a collection of interlinked HTML pages. The pages of the presentation reflect the directory organization of the scanned directories. Each discovered media file is presented in a hypertext link. The pages of the presentation are suitable for service by a web server running on a dedicated media device, such as a digital video recorder. Activation of a link presenting a particular media file generates a request to play the associated media on the dedicated media device. The application may form a potentially useful element for remote, web-oriented management of a dedicated media device.

The demonstration application uses a representation of media files in a file system. The representation uses an object-oriented module including a family of interrelated classes.

The classes represent files and directories. The object-oriented module is specified using a module specification language.

FIG. 36 specifies a class hierarchy which is useful for the media scanner application. The specification is an expression in the synthetic module specification language, which is part of the module generator. Specifications are typically written by a human developer but in some cases a specification may be provided by a computer program. Specifications are processed by a parser to construct a representation of the specified module. The representation is processed to generate object-oriented classes and documentation.

Refer to FIG. 36. A module media-scanner 1330 represents media files arranged in a file system. The media-scanner 1330 includes the following classes. A class file 1332 represents a file in a file system, including regular files and directories. The file 1332 has no genera. A class directory 1334 represents a file system directory, potentially containing files, some of which may themselves be directories. The directory 1334 specializes the file 1332. A class top-directory 1336 represents a topmost directory from which a scan has been initiated. The top-directory 1336 specializes the directory 1334. A class regular-file 1338 represents a regular file, i.e. a file which is not a directory. The regular-file 1338 specializes the file 1332. A class audio-file 1340 represents an audio file. The audio-file 1340 specializes the regular-file 1338. A class video-file 1342 represents a video file. The video-file 1342 specializes the regular-file 1338.

4.1 Specifying a Class Hierarchy

FIG. 36 is a skeletal reprentation of the module media-scanner 1330; it specifies only the module's class hierarchy. At the outermost level, the module media-scanner 1330 is specified. A module is represented by a top-level identifier, optional predicates (none are shown here), and a body. The body is delimited by curly brackets. The body defines a scope within which classes may be specified. Members of a host class may also be specified in the module scope; the host will be considered below.

A module body may contain class specifications. A class is specified by an identifier, optional predicates, and a body delimited by curly brackets. The body defines a class scope within which data members, member functions, and specialized classes may be specified. In FIG. 36, the class file 1332 is specified. Within the body of the file 1332, the species class directory 1334 and the species class regular-file 1338 are specified; the position of specialization classes indicates their relationship to the genus class file 1332. Similarly, the class top-directory 1336, specified within the scope of the directory 1334, is indicated as a species of the directory 1334. The classes audio-file 1340 and video-file 1342 are indicated as species of the regular-file 1338 by their position with the body of the regular-file 1338.

4.2 Specifying Members

FIG. 36 illustrates a specification of genus and species relationships among classes in a class hierarchy. Data members and member functions may also be specified using the specification language. A data member is specified by a type, an identifier, optional predicates, and a semicolon terminator. A member function is specified by a type, an identifier, an argument list, optional predicates, and a semicolon terminator. The argument list is delimited by parentheses; the arguments, if any, are separated by comments. Each argument is specified by a type, an optional identifier, and optional predicates.

Refer to FIG. 37, which expands the specification of FIG. 36 to incorporate members and predicates. The class file 1332 includes a member datum parent 1344, a reference to an instance of the directory 1334. A text member datum name 1346 represents the name of a particular file in its containing directory. A member function path 1348, returning text, provides the full path to a particular file. The definition of the path 1348 is augmented by several predicates (virtual and const); predicates will be considered below the immediately following discussion of types.

The parent 1344 and the name 1346 are respectively typed as a reference to an instance of the directory 1334 and as text. These two types illustrate two of the three most important type distinctions in the module generator: value and reference types. The name 1346 is of text type. Text is considered a value type in the module generator. As such, all the relevant information about the text is contained in its value. Other value types include integer, cardinal, and bit. Value types are scalar; they may be ordered (scaled). Value types correspond to things that can be measured, read, and copied. The relationships that value types represent are denoted as properties (or qualities, in the case of bit values), by analogy with such physical properties as mass, temperature, volume, etc., to emphasize measurablity. In object-oriented implementations, instances of value types are usually transferred by copying values.

The parent 1344 is of reference type; it refers to an instance of a class from the module. Reference types are so-called because they permit a reference to an entity but the content of the reference itself is fundamentally arbitrary. A reference is like a name; it's a label which picks out a particular entity but the content of the label is only significant for its uniqueness. Having a reference, like knowing a name, confers no intrinsic information. Also like a name, a reference is potentially useful for obtaining information about the entity to which it refers. References do not support measurement. References may be tested for equality but ordering of references is meaningless. Of course, entities may be ordered by evaluating properties of the entities, and using an ordering of the evaluated properties to order the entities. The relationships that reference types represent are denoted as associations, to emphasize that they associate entities. In object-oriented implementations, instances of reference types are usually transferred by copying pointers.

A third type distinction recognized by the module generator is the compound type. A compound type represents a collection of scalars or entities; hence it is characterized by both the nature of the collection and by the underlying type of the instances which it collects. The module generator supports sequence, set, and map collections. A sequence provides an ordered collection, to which elements may be added or removed at the front or the back. A set provides a collection of distinct elements (no duplication); a set also provides an efficient determination of whether or not an element is a member. A map provides an efficient association between domain elements and range elements. The class directory 1334 specifies a member datum files 1350, which is a set of references to instances of the file 1332.

Member functions may also be specified. The member function path 1348, from the class file 1332, specifies a member function returning a textual value. A member function is characterized by a return type and an argument list (which may be empty, as for the path 1348). The arguments, like the return value, are typed. Following the arguments, optional predicates may provide supplemental information about the member function, including qualifiers such as virtual and const, and even the definition (implementation) of the member function.

4.3 Predicates

The specification of the member datum files 1350 is augmented by a predicate which qualifies the files 1350 as a meron. The meron qualifier (from meronym, part of a larger whole) indicates that the files 1350 should be considered a part relative to a whole represented by the containing instance of the directory 1334. The meron relation indicates a particularly close relationship between the containing object and the contained member datum; the relation may indicate such significant consequences as memory management, implicit traversal, deep versus shallow copy, etc.

The meron predicate on the files 1350 illustrates a particularly simple predicate. In general, predicates provide supplemental information about the various module entities (classes, members, modules, etc.). Predicates are analogous to attributes in XML or HTML but there are syntactic and semantic differences. Predicates should be interpreted as combining with entities to form synthetic sentences. An entity (such as the member datum files 1350) provides the subject of the synthetic sentence. The predicate provides a "verb" and, optionally one or more complements. Complements are often denoted objects, but the potential confusion with the objects of object-oriented programming favors a distinct term. The predicate verb, typically denoted a relation, need not be a lexical verb. Many predicate relations correspond to intransitive verbs, especially variations on "is" and "has." Often the verb is implicit; for example, the meron predicate "virtual," applied to the member function path 1348, indicates the virtuality of the member function. "Virtual" is of course an adjective; more properly, the relation could be "is-virtual", or an "is" relation could be combined with a "virtual" complement. However it seems most convenient to keep the relation atomic, and use the simple and familiar terminology.

Predicates may incorporate complements. Depending on the predicate relation, zero, one or several complements may be appropriate. For example, the virtual relation requires no complement. Relations such as "purpose" or "term" may require a single complement. A relation such as "note" may combine with several complements. Relations lacking a complement are denoted qualifiers. Relations accepting a single complement are denoted singletons. Relations accepting several complements are denoted pluralities.

In the specification language, predicates are delimited by square brackets, defining a predicate scope. Within a predicate scope, one or more predicates may be present. A predicate is separated from a successor predicate by a semicolon. Each predicate consists of a relation and, optionally, one or more complements. A complement is separated from a successor complement by a comma.

Some important relations include virtual, const, and meron. The virtual relation, a qualifier, indicates the virtuality of a member function. A virtual member function is specified by a genus class subject to specialization by a species class. Virtuality is an extremely useful capability in object-oriented programming. The use of virtual functions permits diverse specializations to be generically driven, effectively decoupling the driver from the specializations. In object-oriented jargon, virtuality is a technique for obtaining polymorphism, which is access to diverse behavior under a common interface. The const relation, a qualifier, indicates that the operand to which it is applied is not subject to any change of state. The const qualifier may be applied to a member function or an argument of a member function. The meron qualifier, applied to a member datum, indicates the part/whole relationship standing between the member datum and its containing instance.

4.4 Host Specification

The classes so far considered have specified representations of entities that are relevant to the media-scanner application: files, directories, etc. The specified classes may be instantiated to provide objects (instances), each of which represents a particular entity from the application domain: a particular file, a particular directory, etc. A single class may be used to instantiate an indefinite number of objects; the details of the individual instantiations are determined by the context in which the application runs (i.e. the particular file system directories which are scanned). When objects are instantiated to represent entities, and associations between entities are represented by assignment to object members, an application-specific object-oriented data structure is constructed. This data structure in its entirety represents the specific context in which the application is operating. The processing which is performed by the application may be simplified by presenting the entire application-specific data structure in a unitary element, of which there is exactly one per application. This unitary element is denoted a host, since it serves the entire application-specific object-oriented data structure.

In the media scanner application, a class host 1352 fulfils the duties of the host. The module generator provides the host 1352 according to the specification. Members specified in the module scope are provided in the host. For the media scanner, those members include a member datum root-files 1354. The application is directed to scan one or more top-level files; these are recursively scanned to identify media files and generate an HTML presentation. The top-level files which initiate the scan are collected in the root-files 1354. The collected top-level files are a natural starting point for top-down processing. In more sophisticated applications, a generated host may provide random access to entities, typically via a textual identifier. A host may also present entities organized by class in some applications.

The module generator provides a host class upon request. The host class in turn may be instantiated to provide a host instance. Unlike classes specified in the module scope, however, only a single instance of the host is typically instantiated in an application. The single host instance provides convenient access to the multitude of entity instances that characterize the application context.

4.5 Syntax Summary

All of the principal elements of the module generator's specification language have been introduced. To recap, at the top level a module is specified by a name, optional predicates, and a scope delimited by curly brackets. Within the module scope, classes and host members are specified. A class specification consists of a name, optional predicates, and a scope delimited by curly brackets. Within a class scope, member and class specifications may appear. Member specifications (including host member specifications in the module scope) include specifications for member data and member functions. A member datum is specified by a type, a name, optional predicates, and a terminal semicolon. A member function is specified by a type, a name, an argument list, optional predicates, and a terminal semicolon. Types range over values, references, and collections. Values include text, integer, bit, etc. References indicate instances of specified classes. Compound types include set, sequence, and map. Compound types further indicate one or more constituent types. Predicates specify supplemental specifications for entities including modules, classes, and members. Predicates are delimited by square brackets; individual predicates are separated by a semicolon. Each predicate includes a textual relation and optional textual complements. Plural complements are separated by a comma. Shell-style comments are also permitted; the hash-mark (octothorpe) indicates a comment which continues to the end of a line.

Refer to FIG. 36. A module media-scanner 1330 represents media files arranged in a file system. The media-scanner 1330 includes the following classes. A class file 1332 represents a file in a file system, including regular files and directories. The file 1332 has no genera. A class directory 1334 represents a file system directory, potentially containing files, some of which may themselves be directories. The directory 1334 specializes the file 1332. A class top-directory 1336 represents a topmost directory from which a scan has been initiated. The top-directory 1336 specializes the directory 1334. A class regular-file 1338 represents a regular file, i.e. a file which is not a directory. The regular-file 1338 specializes the file 1332. A class audio-file 1340 represents an audio file. The audio-file 1340 specializes the regular-file 1338. A class video-file 1342 represents a video file. The video-file 1342 specializes the regular-file 1338.

Refer to FIG. 37. The module media-scanner 1330 represents media files arranged in a file system. A class host 1352 represents an instantiation of the module. The media-scanner 1330 includes the following operator classes. A class viewer 1356 provides a base class for systematic read-only processing of instantiations of the module. A class factory 1358 constructs instances of module classes in response to textual tags.

4.6 Host

Refer to FIG. 37. The class host 1352 represents an instantiation of the module. The host 1352 includes the following members: a member datum root-files 1354.

The member datum root-files 1354 provides a set of instances of the file 1332. The root-files 1354 collects files from which the specified scan is initiated. The root-files 1354 is a meronym of the host 1352.

4.7 File

Refer to FIG. 37. The class file 1332 represents a file in a file system, including regular files and directories. The file 1332 has no genera; it is a root class of the media-scanner 1330. The file 1332 is specialized by the directory 1334. The file 1332 is specialized by the regular-file 1338. The file 1332 includes the following members: a member datum parent 1344, a member datum name 1346, and a member function path 1348.

The member datum parent 1344 provides an instance of the directory 1334. The parent 1344 represents the directory containing a particular file.

The member datum name 1346 provides a text value. The name 1346 represents the name of a particular file in its containing directory.

The member function path 1348 returns a text value. The path 1348 provides the full path to a particular file. The path 1348 is virtual. The path 1348 is const.

4.8 Directory

Refer to FIG. 37. The class directory 1334 represents a file system directory, potentially containing files, some of which may themselves be directories. The directory 1334 specializes the file 1332. The directory 1334 is also known as a folder. The directory 1334 is specialized by the top-directory 1336. The directory 1334 includes the following members: a member datum files 1350 and a member function accept 1360.

The member datum files 1350 provides a set of instances of the file 1332. The files 1350 collects representations of files contained in the directory. The files 1350 is a meronym of the directory 1334.

The member function accept 1360 returns a bit value. The accept 1360 receives a file representation for inclusion in the directory. The accept 1360 accumulates files the the files 1350; also sets the file's parent 1344 to the accepting directory.

4.9 Top Directory

Refer to FIG. 37. The class top-directory 1336 represents a topmost directory from which a scan has been initiated. The top-directory 1336 specializes the directory 1334. The top-directory 1336 has an empty parent 1344. The top-directory 1336 includes the following members: a member function path 1362.

The member function path 1362 returns a text value. The path 1362 provides the full path to a particular file. The path 1362 is virtual. The path 1362 is const. The path 1362 is specialized since the the parent 1344 is empty; the name 1346 contains the full path.

4.10 Regular File

Refer to FIG. 37. The class regular-file 1338 represents a regular file, i.e. a file which is not a directory. The regular-file 1338 specializes the file 1332. The regular-file 1338 is specialized by the audio-file 1340. The regular-file 1338 is specialized by the video-file 1342. The regular-file 1338 does not specify any members.

4.11 Audio File

Refer to FIG. 37. The class audio-file 1340 represents an audio file. The audio-file 1340 specializes the regular-file 1338. The audio-file 1340 does not specify any members.

4.12 Video File

Refer to FIG. 37. The class video-file 1342 represents a video file. The video-file 1342 specializes the regular-file 1338. The video-file 1342 does not specify any members.

4.13 Media Scanner Module Products

The products of the module generator include various classes from the specification. There are many product details but these are not particularly difficult when the general approach to the products is evident. Two broad categories of products are provided by the generator: documentation products and code products. Consideration of documentation products is deferred. Code products may be conveniently divided into two categories: entity-level classes, and module-level classes. The entity-level classes include classes specified at or below the module scope in expressions in the module-specification language. For the media scanner, these are classes like the file 1332, the directory 1334, etc. Entity-level classes are typically representative of entities in the application domain. Thus, a media scanner represents files and directories.

Module-level classes represent elements that are common across application domains. Such elements in the media scanner include the host 1352, the viewer 1356, and the factory 1358. Any application might benefit from host, viewer, and factory classes. Of course, these classes may be highly customized according to the particulars of the application domain entities corresponding to entity-level class specifications (e.g. files and directories). However the "roles" of host, viewer, and factory are common to many application domains.

In a typical application, instances of the entity-level classes proliferate in accordance with the application context (e.g. input files). Instances of entity-level classes are typically created dynamically in correspondence with elements of input data. In contrast, module-level classes typically occur in individuals in a given application. A single host is typical; likewise a single factory. One or a few viewers are typical, each corresponding to particular products. The module-level constituency is determined at compile time; the entity-level instances can only be determined at run time in accordance with the particular data that defines the application context.

4.13.1 Module-Scoped File Product Class

Refer to FIG. 38. Recall that two member data were specified for the class file 1332: the parent 1344, an instance of the directory 1334, and the name 1346, an instance of text. Declarations for these members are found in the product class. The members are declared private, in keeping with standard object-oriented practice. Access to the members is mediated by various member functions, as shown. Note that the parent 1344 is declared a pointer; reference instances are implemented as pointers. By contrast, the name 1346 is simply a text value. A declaration for the specified member function path 1348 is also shown.

A generated member function mediates dispatch to an instance of the viewer 1356. This virtual dispatch permits a generic dispatch to a genus instance (e.g. an instance of the file 1332) to be automatically specialized to a view of particular species (e.g. an instance of the directory 1334).

Refer to FIG. 39. Since the specification has requested the viewer 1356, the virtual dispatch member function was generated, as shown. The viewer 1356 provides a view member function for each entity-level class; each entity-level class provides a viewer dispatch member function, which specializes any generic viewer member functions, e.g., that of the file 1332, as depicted. Each viewer dispatch invokes the particular view member function of the viewer 1356. This permits a client's invocation of the generic dispatch to invoke the appropriate specific view in the viewer 1356. This is a useful idiom which will be demonstrated in the application code below. The idiom is closely related to the "visitor pattern," popularized by Gamma et. al, "Design Patterns", Addison-Wesley (1995), ISBN 0-201-63361-2, pp. 331-344.

4.13.2 Module-Level Host Product Class

Refer to FIG. 40. Recall that one member was specified in module scope and thus for incorporation into the generated host: the member datum root-files 1354, a set of instances of the file 1332. Additional member data are also provided: an instance of the factory 1358 and an instance of a logger. Note that access to the root-files 1354 is provided by reference; various iterators for the collection are also provided. A constructor and destructor are provided. The destructor deletes the constituents of the root-files 1354, due to the specification of the root-files 1354 as a meron. The copy constructor and assignment operator are declared private to indicate that copy and assignment of a host instance is prohibited. Typically a single host instance is provided in an application. Host instances are typically passed by reference.

4.13.3 Module-Level Viewer Product Class

Refer to FIG. 41. The class viewer 1356 provides a handy base class for processors that use variations on the "visitor" pattern. The viewer 1356 provides a distinct view method for each entity-level target class. By default, these methods recursively view any meron member data of the target class, then apply the appropriate view-base method for each immediate genus of the target class. The boolean value returned reflects the successful processing of each meron and each genus, or simply true if there are no merons or genera. For convenience, a view-aggregate member function is provided for relevant collections; these return success according to the success of viewing each constituent of the aggregate.

Refer to FIG. 42. Implementations for some of the member functions are shown. An instance of the file 1332 lacks any meron members, so it simply invokes the view-base, which, in turn, returns boolean success, as the file 1332 lacks genera. The aggregate viewer of a file-set invokes an aggregate viewer on an view iterator. The aggregate viewer for the view iterator invokes the viewer dispatch for each constituent; depending on the particular species, a particular view method of the viewer 1356 will be dispatched. In the particular view member function for instances of the directory 1334, an aggregate view is invoked for the meron member datum files 1350. The view-base for the directory 1334 is then invoked, which in turn invokes a view for the genus file 1332.

The viewer 1356 itself doesn't do any actual work but it does provide a useful traversal framework which is conveniently compartmentalized. A typical viewer specifies the viewer 1356 as a genus, then specializes one or more of the view methods to perform useful work. Typically the useful work may include of some sort of accumulation or output production related to the particular elements that are encountered in the traversal. An example is the HTML writer class, described below.

4.13.4 Module-Level Factory Product Class

Refer to FIG. 43. The class factory 1358 provides construction of instances of entity-level classes in response to textual tags. The class file 1332 was designated as the factory root; the factory 1358 provides instances constructed from the closure of the species of the file 1332 (i.e. species, species of species, etc.). A member function instantiate 1364 provides the construction. A textual tag is supplied to the member function, and an instance of the file 1332 is returned, unless the tag is unrecognized, in which case a zero pointer indicates failure.

The file 1332 defines static instantiator functions for each target class; these simply invoke the appropriate constructor and return the constructed element. However the returned element is "genericized" to the factory root, the file 1332. This is a valid operation since any instance of a species class is also an instance of a corresponding genus class.

A map member is defined which associates the instantiators to textual tags. The map is initialized in the constructor 1366. The map is used in the instantiate 1364 to obtain a static instantiator from the supplied textual tag. The static instantiator, if found, is invoked to obtain an instance of the file 1332.

4.14 Media Scanner Application

The module generator has done its work; the module specification has been processed to provide product classes. To get a complete application, however, additional components are required. A class builder 1368 traverses the file system; the builder 1368 will construct an application-specific data structure consisting of interlinked specializations of the file 1332. The data struture will reside in an instance of the host 1352. The builder 1368 will make use of the factory 1358. A class writer 1370 produces the HTML product. The writer 1370 processes a host instantiation. A command-line application 1372 brings together the builder 1368, host 1352, and writer 1370.

4.14.1 Builder

Refer to FIG. 44. The class builder 1368 recursively scans the file system, starting from a specified file. Most of the nitty-gritty work is performed by a base class file-walker 1374; the file-walker 1374 delivers notifications via virtual member functions, which are specialized by the builder 1368. The file-walker 1374 is an adaptation based on W. Richard Stevens, "Advanced Programming in the Unix Environment", Addison-Wesley (1992), ISBN 0-201-56317-7, pp. 108-111. Stevens' implementation in turn follows closely the Unix library function nftw. The file-walker 1374 will not be considered in detail. Note, however, that the file-walker 1374 provides a member function visit 1376 which initiates a recursive scan starting from the path specified by its textual argument.

An instance of the builder 1368 is provided with an instance of the host 1352 at construction; the notifications of files are translated to operations on the supplied host and its constituents.

The builder 1368 provides responders which are responsive to notifications from the base class, corresponding to events in the file-system traversal. The responders are member functions, specialized from their generic definitions in the base class: a member function root-dir-open 1378, a member function root-dir-close 1380, a member function dir-open 1382, a member function dir-close 1384, and a member function regular-file 1386. These member functions will be considered in detail below. An instance of the builder 1368 maintains a member stack of instances of the directory 1334, the directory stack, corresponding to directories which have been entered but not yet exited. An instance of the builder 1368 also maintains a PCRE regular expression which is used to compute file names and extensions from supplied paths. The PCRE (Perl-Compatible Regular Expression) library is widely used for text processing in C and C++ programs; documentation is readily available in Unix distributions and online (cf. http://www.pcre.org/).

Refer to FIG. 45. The member function root-dir-open 1378 is invoked upon entering a root directory (i.e. a directory specified in an invocation of the visit 1376). An instance of the top-directory 1336 is created, named, provided to the host, and pushed onto the stack. The complementary member function root-dir-close 1380 (not shown) is invoked upon exiting a root directory. The stack is popped.

The member function dir-open 1382 is invoked upon entering a non-root directory. An instance of the directory 1334 is created, named, provided to the topmost directory on the stack, and pushed onto the stack. The complementary member function dir-close 1384 (not shown) is invoked upon exiting a non-root directory. The directory stack is popped.

The member function regular-file 1386 is invoked upon encountering a regular file (i.e. a file which is not a directory). The name of the regular file is processed by execution of the regular expression to obtain a file extension. The file extension is supplied to the instantiate 1364; an instance of the file 1332 is returned if the extension is recognized. If a file instance is returned, it's named and provided to the topmost directory on the stack.

4.14.2 Writer

The writer 1370 is necessarily burdened with various details that are germane to the generation of a family of interlinked HTML files and directories. Most of these details are unrelated to this demonstration so a cursory description will suffice. A class writer 1370, specializing the viewer 1356, processes an instance of the host 1352 to generate interlinked HTML pages and directories. A class page 1388 represents individual HTML pages in the output.

Refer to FIG. 46. The class page 1388 represents an HTML page consisting of links to audio, video, and directory pages. Audio, video, and page instances are accumulated. An instance of the page 1388 is specified by a path and a name, indicated where the HTML file shall be written. A write method provides actual HTML, including links to parent and child pages, as well as links to video and audio files.

Refer to FIG. 47. The class writer 1370 specializes the viewer 1356. An instance of the writer 1370 is supplied with an instance of the host 1352 and a textual target directory on construction. The writer 1370 provides view methods for the top-directory 1336, the directory 1334, the audio-file 1340, and the video-file 1342. The writer 1370 maintains a stack of instances of the page 1388, each of which corresponds to a scanned file system directory which has been entered but not yet exited. An instance of the page 1388 provides a presentation of a file-system directory. A top-level index page is also generated, collecting all of the top-level directories from which scans were initiated.

Refer to FIG. 48. A dir-page member function captures the processing requirements common to instances of the directory 1334, including its specialization the top-directory 1336. The instance of the directory 1334 is presented in a corresponding instance of the page 1388. A directory is created in the file system if it doesn't already exit. The constituents of the supplied instance of the directory 1334 are recursively visited, in sorted order. The corresponding instance of the page 1388 is written. The page instance is accumulated to topmost stack page.

Refer to FIG. 48. The specialized view member functions for instances of the top-directory 1336 and the directory 1334 are shown. These member functions specialize the corresponding view member functions of the viewer 1356. The specialized member functions invoke distinct constructors for an instance of the page 1388, corresponding to slightly different requirements for top-level and other directories. Then presentation is delegated to the dir-page member function described above.

Refer to FIG. 48. An aggregate viewer member function is shown, as required by the dir-page member function. The aggregate viewer simply traverses the collection and invokes the generic viewer dispatch. This will result in dispatch to the appropriate specialized view. The specialized view for instances of the directory 1334 is described above. The specialized view for instances of the audio-file 1340 and the video-file 1342 are shown below.

Refer to FIG. 49. The specialized view for instances of the audio-file 1340 and the video-file 1342 are shown. These simply accumulate themselves to the topmost instance of the page 1388 on the stack.

4.14.3 Main Program

Refer to FIG. 50. The command-line application 1372 is shown. A target directory is plucked from the end of the command line. An instance of the host 1352 is constructed. An instance of the builder 1368 is constructed, initialized with the host instance. Each remaining command-line argument specifies a top-level directory from which to scan; the scans are initiated by invocation of the member function visit 1376. The host instance is populated in the course of the scans.

If the scans have succeeded, an instance of the writer 1370 is constructed, initialized wth the host instance and the target directory. The writer instance performs its traversal from the constructor, so there is no further action required. The interlinked HTML files and any required directories are generated below the target directory.

5 Module Processors

Various processors are provided to realize value from the meta-module 1016. The processors may be divided into two broad collections. Processors which write programming language code for compilation, linking, and execution are designated as elements of the code-generator 1012. Processors which write documentation for formatting to presentation-oriented media such as HTML are PDF are designated as elements of the document-generator 1014.

5.1 Code Generators

Refer to FIG. 51. The elements of the code-generator 1012 write programming language code for compilation, linking, and execution. A generator forwards-writer 1390 provides forward-declarations 1392 and typedefs for use by processors and other components. A generator classes-writer 1394 provides class-definitions 1396 and implementations of member functions for constituent classes of a module. A generator viewer-writer 1398 defines a base class viewer 1400 which provides useful default behavior for specialized processors which provide read-only processing of an application-specific data structure representing an instantiation of a module. A generator editor-writer 1402 defines a base class editor 1404 which provides useful default behavior for speciailized processors which modify an application-specific data structure representing an instantiation of a module. A generator acceptors-writer 1406 defines acceptors 1408, including classes which provide a facility for type-safe processing of generic elements (typically from markup processing or synthetic-language parsing) to specific elements suitable for accumulation as member data in an application-specific data structure. A generator predicators-writer 1410 defines predicator definitions 1412, including classes which provide a facility for type-safe processing of generic attributes (typically from markup processing or synthetic-language parsing) to specific elements suitable for accumulation as member data in an application-specific data structure. A generator factory-writer 1414 defines a class factory 1416, which provides type-safe instantiation of specific elements according to textual tags such as are obtained in markup processing or synthetic-language parsing. A generator host-writer 1418 defines a class host 1420, which represents an instantiation of a module. An instantiation of a module is an application-specific data structure, the elements of which are instances of the classes which are the consituents of a module. A generator reflector-writer 1422 defines a class reflector 1424, which provides run-time representations of genera and species relationships among classes. A generator auditor-writer 1426 defines a class auditor 1428, which provides verification of specified characteristics of an instantiation of a module.

5.1.1 Forwards Writer

Refer to FIG. 52, which depicts excerpts of the output of the forwards-writer 1390 operating on the media-scanner 1330. The generator forwards-writer 1390 processes an instance of the module 1028 to generate includes 1430, forward-declarations 1392, module-services 1432, and typedefs 1434 for use by module processors and other components. The includes 1430 provide include directives for the template classes which underly compound types which are used by the specified module. The forward-declarations 1392 provide a forward class declaration for each instance of the class 1036. The module-services 1432 provide forward class declarations for module-level processors according to the module specification. The typedefs 1434 provide convenient type definition for compound types which are used in the module.

The forwards-writer 1390 processes an instance of the module 1028. The root-classes 1132 are visited; for each visited class, an element of the forward-declarations 1392 is generated. The members 1038 of the class are visited; the members in turn dispatch visits to their associated types, including the type 1226, and, for member functions, the type 1226 for each element of the arguments 1050. Each visited type may contribute an element to the typedefs 1434 and an element to the includes 1430. The typedefs 1434 and includes 1430 are represented by sets in the forwards-writer 1390 so duplicate typedefs and includes are suppressed. The module-services 1432 are generated according to the specified module-level elements of the supplied instance of the module 1028.

5.1.2 Classes Writer

Refer to FIG. 53, which depicts excerpts of output from the classes-writer 1394. The generator classes-writer 1394 provides class-definitions 1396 and member-function-definitions 1436 for constituent classes of a module.

The classes-writer 1394 processes an instance of the module 1028. The classes 1030 are visited; for each visited class, a class definition is accumulated to the class-definitions 1396 and member function definitions are accumulated to the member-function-definitions 1436. The class definition incorporates the instance of the genera 1176, if any, as public base classes. The members 1038 of each class are visited to generate elements of the class definition and member function definitions. For each instance of the member-datum 1052, a member definition is accumulated to a collection of member-datum-definitions 1438. Member function definitions are accumulated to collections of view-member-access 1440, edit-member-access 1442, reset-member-access 1444, and uniform-member-acceptors 1446. Additional member function definitions are accumulated for compound member datum; these are accumulated to compound-member-viewers 1448 and compound-member-editors 1450. Where necessary, private access to member data is provided (e.g., where access to member data is limited by an acceptor 1260), including friend declarations, as necessary (e.g., where an acceptor 1260 is from a distinct class). Where necessary, constructor initialization is provided for member data.

Where instances of the member-function 1048 are specified, declarations are accumulated to specified-member-functions 1452. If inline or other definitions of the member functions are specified, they are accumulated in the specified-member-functions 1452 or in the member-function-definitions 1436.

If the auditor-id 1144 is specified, an audit member function declaration is provided in the class definition, and a definition is provided which incorporates any specified audit-requirements 1210. If markup processing is specified, member function declarations are provided as specified.

If the viewer-id 1136 is specified, a viewer-dispatch 1454 is declared and defined. If the editor-id 1138 is specified, an editor dispatch is declared and defined. If the predicator-id 1158 is specified, dispatch to the generated predicator and the generated promissary reference is declared and defined. If the acceptor-id 1156 is specified, dispatch to the generated acceptor is declared and defined. If the factory-id 1140 is specified, requests for acceptor and predicators are declared and defined.

A reflector-interface 1456 is provided for class identification at run-time. A constructor and destructor are provided in a factory 1458. The constructor incorporates any required initialization of member data. The destructor incorporates any required deletion of meron-specified member data.

5.1.3 Viewer Writer

Refer to FIG. 54, which depicts output excerpts for the viewer-writer 1398. The generator viewer-writer 1398 defines a class viewer 1400 which provides useful default behavior for specialized processors which provide read-only processing of an application-specific data structure representing an instantiation of a module.

The viewer-writer 1398 processes an instance of the module 1028. The viewer-writer 1398 visits each instance of the classes 1030. For each visited class, a virtual view responder is generated, which is accumulated to view-members 1460. A view-base responder is generated, a declaration of which is accumulated to view-base-members 1462. A view-agg responder is generated, each unique declaration being accumulated to the view-agg-members 1464.

Refer to FIG. 55, which depicts additional excerpts of code generated by the viewer-writer 1398. For each visited class, the generated element of the view-members 1460 recursively dispatches views to meron members and to the corresponding generated element of the view-base-members 1462 The generated element of the view-base-members 1462 dispatches to the genera of the class. Any generated element of the view-agg-members 1464 dispatches to each contained instance in the compound datum.

5.1.4 Editor Writer

The processor editor-writer 1402 defines a class editor 1404, which provides useful default behavior for specialized processors which modify an application-specific data structure representing an instantiation of a module. The editor 1404 generated by the editor-writer 1402 is structurally similar to the class viewer 1400 generated by the viewer-writer 1398, however the view operations are replaced by edit operations, and the instance arguments are not const, since the editor is enabled to make changes to the data structure.

5.1.5 Acceptors Writer

The generator acceptors-writer 1406 defines acceptors 1408 which provide a facility for type-safe processing of generic elements (typically from markup processing or synthetic-language parsing) to specific elements suitable for accumulation as member data in an application-specific data structure. The acceptors 1408 include a class base-acceptor 1466, a collection of classes specialized-acceptors 1468, and a collection of classes acceptor-hosts 1470.

Refer to FIG. 56, which depicts part of a module specification, including a specification of an acceptor. A module 1472 specifies an acceptor 1474. The module 1472 includes a class element 1476, a class item 1478, and a class channel 1480. The channel 1480 includes a member datum items 1482, a sequence of instances of the item 1478.

The base-acceptor 1466 defines a collection of virtual accept methods, each of which corresponds to a particular module class. When an instance of the module 1028 specifies an acceptor via the acceptor-id 1156, the classes-writer 1394 generates, for each particular module class, a dispatch to the base-acceptor 1466, which in turn invokes the particular accept method corresponding to the particular module class.

Refer to FIG. 57, which depicts excerpts of the code generated by the acceptors-writer 1406. The acceptors-writer 1406 generates the acceptor 1474, a base-acceptor 1466, which includes an accept virtual member function for each class in the module.

Refer to FIG. 58, which depicts the implementations of the virtual accept member functions generated by the acceptors-writer 1406 for the class acceptor 1474. The acceptors-writer 1406 provides an implementation for each accept member function which delegates acceptance to each genus of the argument class, if any. If no genus implementation accepts the argument, the accept fails.

Each specialized acceptor class of the collection specialized-acceptors 1468 corresponds to a particular member datum which is capable of accepting a reference datum. Acceptance capability may be inhibited when direct assignment to the datum is restricted via the inhibit-predicator 1262. In the exemplary embodiment, acceptance capability is provided for member data for which the type 1226 is referential, including the reference-type 1068, the reference-sequence-type 1076, and the reference-set-type 1082. In an alternate embodiment, acceptance could be generalized to scalar member data, in which the textual content of the markup elements would serve as the basis for scanning to binary scalar values.

Each specialized acceptor class specializes the base-acceptor 1466. On instantiation, an instance of the specialized acceptor class is supplied with a target instance of the class for which the particular member datum was specified; the target instance is reserved as a private member of the specialized acceptor class. Each specialized acceptor class specializes the particular accept method corresponding to the acceptance type of the member; for a reference-type 1068, the acceptance type corresponds to the reference-class-id 1284. For compound types, the acceptance type corresponds to the reference-range 1302 or the reference-range 1308. The specialized accept method is supplied with an instance corresponding to the acceptance type; this instance is then assigned to the particular member datum of the reserved target instance.

Refer to FIG. 59, which depicts a specialized acceptor class generated by the acceptors-writer 1406. The specialized acceptor class, an element of the specialized-acceptors 1468, corresponds to the member datum items 1482. The acceptors-writer 1406 generates a specialization of the acceptor 1474 for each suitable member datum of each particular class of the module. For the member datum items 1482, a class channel-items-acceptor 1484 is generated by the acceptor 1474. The channel-items-acceptor 1484 is initialized with an instance of the channel 1480, which provides the target to which instances of the item 1478 may accumulate. The channel-items-acceptor 1484 specializes the virtual accept member function of the acceptor 1474 for the item 1478, corresponding to the acceptance of an instance of the item 1478 directed to the member datum items 1482 for the target instance of the channel 1480. The specialized accept member function invokes an acceptance member function of the channel 1480 (which is generated by the classes-writer 1394).

Each acceptor host class of the collection acceptor-hosts 1470 provides a mapping from textual tags to acceptors, as well as instantiation services mapping textual tags to module class instances. In a markup processing context, a generic element may be presented for acceptance in association with a textual tag. Moreover, a textual tag may need to be related to a member to determine the proper specialized instantiation of an instance which is to correspond to the textual tag. An acceptor host class performs these two functions: instantiate a specialized element in response to a textual tag in the context of a containing instance, and accept a generalized element corresponding to a textual tag and ensure that the generalized element is properly specialized for assignment to a member datum corresponding to the textual tag.

Refer to FIG. 60, which depicts an acceptor-hosts 1470, generated by the acceptors-writer 1406. A class channel-acceptor-host 1486, generated by the acceptors-writer 1406, provides an acceptor host class for the class channel 1480. The channel-acceptor-host 1486 includes an acceptor member function, which provides an instance of the acceptor 1474 in response to an instance of the channel 1480 and a textual tag. The textual tag specifies a particular member datum of the channel 1480. The channel-acceptor-host 1486 includes a member function instantiate 1488, which, in response to a textual tag, instantiates an appropriate instance for the member datum corresponding the supplied tag. The channel-acceptor-host 1486 includes a member function acceptor 1490, which, in reponse to a target instance of the channel 1480 and a textual tag, provides an instance of the acceptor 1474, suitable for assignment to the target instance of the member datum corresponding to the supplied textual tag.

The channel-acceptor-host 1486 includes two static member functions (class functions), respectively providing instantiation of an instance of the channel-items-acceptor 1484 and instantiation of an instance of the item 1478. The channel-acceptor-host 1486 defines two index maps, respectively mapping from textual tags corresponding to member data to class functions.

Refer to FIG. 61, which depicts the implementations of member functions for the channel-acceptor-host 1486, generated by the acceptors-writer 1406. A constructor provides initialization of the index maps which associate textual tags with class functions providing acceptors and instantiators, respectively. The sole member datum for the channel 1480 is the items 1482, so there is only one initialization per table. More generally, where there are multiple member data, there are several initializations for each table.

The generated implementation of the member function acceptor 1490 is also shown in FIG. 61. An acceptor provider is sought from the acceptor index map, corresponding to the supplied tag. If an acceptor provider is obtained, it is invoked with the supplied target instance of the channel 1480. Otherwise a zero pointer is returned to indicate failure.

The generated implementation of the member function instantiate 1488 is also shown in FIG. 61. An instantiator is sought from the instantiator index map, corresponding to the supplied tag. If an instantiator is obtained, it is invoked. Otherwise a zero pointer is returned to indicate failure.

Refer to FIG. 62, which illustrates some excerpts of the class element 1476 and the class channel 1480. The element 1476 includes an accept-element member function, which is provided with a textual tag and an instance of the element 1476. The accept-element member function is not generated; it must be provided by the developer. The accept-element member function is considered below.

The element 1476 further includes generated virtual member functions for dispatching to an acceptor and for requesting an acceptor. The channel 1480 specializes those dispatch methods, dispatching them to the supplied factory instance, which will be considered below. The channel 1480 also provides the accept member function which accumulates a supplied instance of the item 1478 to the items 1482.

Refer to FIG. 63, which depicts the accept-element member function, which is not generated but must be provided by the developer. The member function requests an instance of the acceptor 1474, which, if obtained, is dispatched to the element which is a candidate for acceptence. If the dispatch succeeds, the element was accepted. Note that this general mechanism uses generic classes such as the element 1476 and the acceptor 1474. Specific situations such as an instance of the item 1478 provided to an instance of the channel 1480 using the tag "item" will be correctly handled by this mechanism, without any need for casting or switching. Moreover, the addition of new members and tags and even new module classes does not require any additional coding by the developer; the generated code will expand to permit this generic mechanism to handle the specific situations.

5.1.6 Predicators Writer

The processor predicators-writer 1410 provides predicator definitions 1412 which collectively provide a facility for type-safe processing of textual attributes or predicates (typically from markup processing or synthetic-language parsing) to specific elements suitable for accumulation as member data in an application-specific data structure. The predicators-writer 1410 processes an instance of the module 1028, visiting contained instances of the class 1036, the member-datum 1052, and associated instances of the type 1054. A predicate relation specifies a textual tag which may correspond to a textual element from the tags 1264 of an instance of the member-datum 1052. The predicate complements may specify the value or instance to be assigned to the corresponding member datum. A particular textual tag may occur in more than one instance of the member-datum 1052; this is acceptible if the classes that specify the member data corresponding to the shared tag are distinct.

There are three distinct cases for processing by the predicators-writer 1410, according to the specifics of the member datum to which the predicate or attribute is directed. The simplest case is scalar member data, where the type 1226 corresponds to the value-type 1058, the value-sequence-type 1074, and the value-set-type 1080. In this case, textual data may require scanning to a binary value, followed by assignment to a particular member datum. In the second case, corresponding to meron member data, with the type 1226 corresponding to the reference-type 1068, the reference-sequence-type 1076, and the reference-set-type 1082, an instance of the specified type is instantiated, an identifier is assigned as necessary, and the newly instantiated element is assigned to the particular member datum. In the third case, corresponding to non-meron member data with the type 1226 corresponding to the reference-type 1068, the reference-sequence-type 1076, and the reference-set-type 1082, any textual complement is assumed to refer to an identifier corresponding to an instance of the correct type. However the reference instance may not yet be instantiated, so a promissary reference is created, in which the resolution of the reference is deferred. At a later time, typically when parsing or markup processing is complete, promissary references are redeemed with resolution to instances, and member data is assigned.

The predicators-writer 1410 generates predicator base class definitions 1492, which are classes that permit generic manipulation of textual data in the early phases of predicate processing. The predicators-writer 1410 generates generic predicator apply operations 1494, which are virtual member functions of the base predicator of the predicator base class definitions 1492. The generic predicator apply operations 1494 are invoked by specific target instances which are to receive a member assignment specified by a textual relation and optional complements. The predicators-writer 1410 generates predicator specializations 1496, which are classes that specialize the predicator base class definitions 1492. An element of the predicator specializations 1496 is generated for each unique occurence of a particular tag from the tags 1264. Each element of the predicator specializations 1496 includes one or more elements of a collection of specific predicator apply operations 1498. Each element of the specific predicator apply operations 1498 is a member function corresponding to a particular class, where the instance of the class serves as a target to which a member datum is to be assigned. Each element of the specific predicator apply operations 1498 specializes an element of the generic predicator apply operations 1494.

The predicators-writer 1410 also generates a promissary reference base class definition 1500, a base class that permits generic manipulation of textual references, the resolution of which is deferred from the processing of the attribute or predicate. The promissary reference base class definition 1500 includes a collection of generic promissary acceptor operations 1502, each of which is a virtual member function, one per instance of the class 1036, corresponding to the redemption of a promissary reference. The promissary reference base class definition 1500 is complemented by a collection of promissary reference definition 1504, corresponding to each instance of the member-datum 1052, as necessary. Each element of the promissary reference definition 1504 provides an element of a collection of specific promissary acceptor operations 1506, each of which specializes one of the generic promissary acceptor operations 1502, in which an instance corresponding to a resolved reference is accepted as member data.

Refer to FIG. 64, which depicts excerpts from the class predicator 1508 and several specializations, collectively predicator base class definitions 1492, generated by the processor predicators-writer 1410. The predicator 1508 includes generic predicator apply operations 1494, each of which is a virtual member function corresponding to a particular class of the module. Only a representative few of these are shown in the Fig. The virtual apply indicates the application of a predicate to a target element. Particular predicators specialize the predicator 1508 and specific predicator apply operations 1498, which specialize the apply member function corresponding to the particular classes to which the predicates are applicable.

Predicators are characterized according to plurality of complements. The class predicator-qualifier 1510, specializing the predicator 1508, does not accept any complements. The class predicator-singleton 1512, specializing the predicator 1508, represents a predicate accepting a single complement. The class predicator-plurality 1514, specializing the predicator 1508, represents a predicate accepting multiple complements.

Refer to FIG. 65, which depicts examples of predicator specializations 1496. The simplest predicate application is illustrated by a class qualifier 1516, which demonstrates a value predicator specialization 1518. The particular example from the collection of specific predicator apply operations 1498 is provided by a value specific predicator apply operation 1520, in which the boolean member datum is reset.

A class meron-predicator 1522 depicts the slightly more elaborate response to a meron reference predicate, which demonstrates an instantiating predicator specialization 1524. In an instantiating specific predicator apply operation 1526, another example of the specific predicator apply operations 1498, an instance of the host-class 1040 is constructed, the identifer of the instance is set from the predicate complement, and the newly constructed instance is offered to the target, an instance of the module 1028.

Refer to FIG. 66, which depicts a generated class promissary-reference 1528, exemplary of the promissary reference base class definition 1500. The promissary-reference 1528 is initialized with a tag, identifier, and source, all which are textual. The tag represents the predicate relation. The identifier represents the reference element. The source provides additional information for reporting errors. The promissary-reference 1528 includes a member function promissary resolve operation 1530, in which the host resolver is provided with the identifier, potentially obtaining a generic element. If an element is obtained, a resolution notification is dispatched to the element, which, if successful, will result in the invocation of a properly specialized invocation of an accept member function. The promissary-reference 1528 includes a collection of generic promissary acceptor operations 1502, each of which is a virtual accept member function corresponding to a class of the the module, of which only one particular member function is shown in the figure.

Refer to FIG. 67, which depicts elements generated by the predicators-writer 1410 and other processors in support of promissary references. The generated class member-function 1048 includes a specialization of a promissary dispatch 1532, to which it responds with an invocation of the corresponding element of the generic promissary acceptor operations 1502 of the promissary-reference 1528. A suitably specialized virtual accept member function, an element of the specific promissary acceptor operations 1506, is provided in the class promissary-reference 1534, which specializes the promissary-reference 1528. In the specialized accept member function, the supplied instance of the member-function 1048 is finally assigned to the target, in this case, the member datum acceptor 1260 of the class member-datum 1052.

A class acceptor-singleton 1536, specializing the predicator-singleton 1512, provides a promissary predicator specialization 1538. In the supplied element of the specific predicator apply operations 1498, a promissary specific predicator apply operation 1540 is supplied. The target instance of the member-datum 1052 is used to instantiate a promissary-reference 1534. Also supplied in the instantiation is a complement, which provides the identifier, for which resolution is deferred. The newly instantiated promissary reference is deposited in the host, where it will be held until resolution is initiated, presumably at the conclusion of parsing.

5.1.7 Factory Writer

The processor factory-writer 1414 processes an instance of the module 1028 to define a class factory 1416, which provides type-safe instantiation of specific elements according to textual tags such as are obtained in markup processing or synthetic-language parsing.

Refer to FIG. 68, which depicts an excerpt of the class factory 1542 generated by the factory-writer 1414. The factory-writer 1414 is exemplary of the factory 1416. A constructor is generated to provide initialization of the member data. Two instantiators 1544 are provided; one is context-independent, accepting a textual argument corresponding to the tag for a class in the module. The other instantate member function is context-sensitive. The context is provided by the supplied instance of the element 1476. The supplied tag may then specify a member datum or a class.

The factory 1542 provides acceptors on request, corresponding to specific contexts; a specific context is provided by a species of the generic element 1476. The provision of acceptors is mediated by a collection of acceptor-responders 1546 member functions, one for each particular instance of the class 1036 from the classes 1030. The factory 1542 provides context-instantiator-responders 1548 on request, corresponding to specific contexts; a specific context is provided by a species of the generic element 1476. A collection acceptor-host-members 1550 of members are provided, one for each particular instance of the class 1036 from the classes 1030. The members correspond to the acceptor-hosts 1470 generated by the acceptors-writer 1406, of which the channel-acceptor-host 1486 is exemplary.

A collection of static-instantiators 1552 is provided, each of which provides instantiation for a particular instance of the class 1036 from the classes 1030, except where the particular instance of the class 1036 corresponds to a pure abstract class. A pure abstract class defines or inherits without intervening specialization a pure virtual member function. An instantiator-map-member 1554 provides an association of elements of the static-instantiators 1552 to textual tags. The textual tags correspond to the tags 1206 of the particular instance of the class 1036 corresponding to the associated element of the static-instantiators 1552.

Refer to FIG. 69, which depicts implementation of some member functions for the class factory 1542, as generated by the factory-writer 1414. The constructor uses a collection of instantiator-map-initializers 1556, which collectively intialize the mapping from tags to elements of the static-instantiators 1552. The context-independent instantiator of the instantiators 1544 maps the tag to an element of the static-instantiators 1552, which, if obtained, is invoked. The context-sensitive instantiator of the instantiators 1544 dispatches a generic request for instantiation to the context element. The generic request is specialized in the particular class of the context element, resulting in invocation of a particular element of the context-instantiator-responders 1548.

5.1.8 Host Writer

The processor host-writer 1418 processes an instance of the module 1028 to define the class host 1018, which represents an instantiation of the processed module. An instantiation of a module is an application-specific object-oriented data structure, the elements of which are instances of the classes 1030 of the module instance. The host-writer 1418 may also generate definitions for support classes, including a resolver 1558 and a depository 1560. The generated resolver 1558 provides an association between textual identifiers and instances. The generated depository 1560 caches and eventually redeems instances of the promissary reference base class definition 1500.

Refer to FIG. 70, which depicts class definitions for a resolver 1558 and a depository 1560, generated by the host-writer 1418. The resolver 1558 is exemplified by generated class resolver 1562, specializing the editor 1564. The resolver 1562 provides an edit member function responsive to instances of the entity 1026, which is specified as the resolver root, via the member datum resolver-root-id 1154. The edit member function associates the value of the member datum id 1106 with the particular instance of the entity 1026. The id 1106 is specified as the resolver identifier field, via the member datum resolver-id-field 1152. The resolver 1562 provides const and non-const resolve methods for determining the associated instance of the entity 1026 for a particular identifier. The resolver 1562 includes an index member which maintains the mapping from textual identifiers to instances of the entity 1026.

The depository 1560 is supplied by a generated class depository 1566, which accepts instances of the promissary-reference 1528, for later redemption. Redemption of promissary references is obtain upon invocation of a redeem member function. Resolution is requested for each deposited promissary reference.

Refer to FIG. 71. The host-writer 1418 visits the members 1038 of the instance of the host 1034 to determine client-member-data 1568 and client-member-functions 1570, which are member data and functions, respectively, specified in module scope. The host-writer 1418 uses elements of the classes-writer 1394 to generate supporting member functions for the client-member-data 1568. Additional module-member-data 1572 are generated from module predicate specifications. The module-member-data 1572 members generated for a host may include an predicator, a depository for promissary references, a resolver, a factory, a reflector, and an acceptor. The client-member-data 1568 are at the discretion of the developer. The module-member-data 1572 are, generated at the request of the developer, but the member characteristics are provided by the generator. The host-writer 1418 generates member-access 1574 elements, including member functions which provide access to the client-member-data 1568 and the module-member-data 1572. The host-writer 1418 generates factory 1576 elements, including a constructor with initializers for member data, as necessary, and a destructor with deletion of meron member data.

5.1.9 Reflector Writer

The processor reflector-writer 1422 processes an instance of the module 1028 to generate a class reflector 1424 which provides run-time representations of genera and species relationships among classes. Such relationships are explicit at compile time, but at run time they are implicit and not immediately accessible to computations. Most computations do not require explicit access to these relationships but in some computational contexts they are very useful. The reflector-writer 1422 visits the instances of the classes 1030 for the supplied instance of the module 1028, processing the species 1180 to construct an explicit representation of the genera and species relationships.

Refer to FIG. 72, which depicts the generated class reflector 1578, a reflector 1424, generated by the processor reflector-writer 1422. The reflector 1578 provides various representations of species and genera relationships amongst the classes in a module. These relationships are presenting using textual identifiers for classes, since, at least in C++, classes do not have an explicit run-time representation. Among the elements generated for module classes are textual identifiers, which are available as static functions organized by class and as virtual member functions available from particular instances. These textual identifiers include the formal class identifier id 1106, as well as optional additional tags specified by the developer.

The reflector-writer 1422 generates factory-services 1580, including constructor and destructor elements. The generated class reflector 1578 provides id-services 1582, including a mapping from identifiers to canonical identifiers. Identifiers include tags (elements of the tags 1206) and formal class identifiers (the id 1106). Canonical identifiers are always formal class identifiers. The reflector 1578 provides a validation which indicates whether a candidate identifier is recognized.

The generated class reflector 1578 provides set-services 1584 and sequence-services 1586 to represent genera and species relationships. The reflector 1578 provides immediate species and genera as well as the resursive closure of species and genera (i.e. children, parents, descendents, and ancestors). Set representations are useful for efficient testing of membership of a first class amongst the species or genera of a second class. Sequence representations are useful for scanning, especially genera; the ordering of the sequence is from most specific to most generic, which is the typical order used, e.g. at compile-time, to resolve names in a class scope.

The generated class reflector 1578 provides an empty set, lacking any identifiers, and a universal set, including all the canonical identifiers for the classes in a module. The reflector 1578 provides the set of immediate species and the closure set of species for a class represented by an identifier. The closure set of species is the recursive closure of species; i.e. all specializations. The reflector 1578 provides the set of immediate genera and the closure set of genera for a class represented by an identifier. The closure set of genera is the recursive closure of genera; i.e. all generalizations.

The reflector-writer 1422 generates member-data 1588 which explicitly represents genera and species relationships. The generated class reflector 1578 provides an empty sequence, lacking any identifiers, and a universal sequence, including all the canonical identifiers for the classes in a module. The reflector 1578 provides the sequence of immediate species and the closure sequence of species for a class represented by an identifier. The reflector 1578 provides the sequence of immediate genera and the closure sequence of genera for a class represented by an identifier.

Refer to FIG. 73, which depicts an excerpt from the constructor of the reflector 1578, generated by the reflector-writer 1422. The generated constructor is an element of the factory-services 1580; the member-data 1588 is initialized in the constructor. The reflector-writer 1422 visits the genera from most general to least general, ensuring that all of a class's genera have been visited before the class is visited. For each class, a genera set and sequence and a genera closure set and sequence are created. For each genus class, the genera set is augmented with the genus class. The genera closure set is augmented with the genera closure set of the genus class. The genera sequence and the genera closure sequence are augmented with the genus class. The genera closure sequence is augmented with the genera closure sequence of the genus class. The genera closure set is augmented with the genera set.

Refer to FIG. 74, which depicts an excerpt from the constructor of the reflector 1578, generated by the reflector-writer 1422. The reflector-writer 1422 visits the species from most specific to least specific, ensuring that all of a class's species are visited before the class is visited. For each class, a species set and sequence and a species closure set and sequence are created. For each species class, the species set is augmented with the species class. The species closure set is augmented with the species closure set of the species class. The species sequence and the species closure sequence are augmented with the species class. The species closure sequence is augmented with the species closure sequence of the species class.

5.1.10 Auditor Writer

The processor auditor-writer 1426 processes an instance of the module 1028 to generate a class auditor 1428 which provides verification of specified characteristics of an instantiation of a module. The developer may specify an audit processor for a module via the member datum auditor-id 1144 of the class module 1028. The developer may specify boolean requirements for a specified class via the member datum audit-requirements 1210 of the class class 1036. The auditor-writer 1426 visits the supplied instance of the module 1028 and the instances of the classes 1030.

Refer to FIG. 75, which depicts a class auditor 1590, an auditor 1428, generated by the auditor-writer 1426. The auditor 1590 specializes the viewer 1592, indicating that it views but does not edit the application-specific data structure. The auditor 1590 is initialized with a logger, which facilitates meaningful error messages. The developer may specify a logging-context 1594 via the member datum auditor-context 1214 of the class class 1036.

The auditor-writer 1426 generates a collection views 1596, each a member function specializing a view member function of the viewer 1592. An element of the views 1596 is generated for each class with specified audit requirements. An exemplary member function of the views 1596 is shown for the class entity-1026. The generated member function creates a logging context, invokes the audit member function of the entity 1026 (generated by the classes-writer 1394, see below), and, if the audit is successful, delegates the view to the default for the base class viewer 1592, which in turn recursively dispatches views for the meron member data of the entity 1026, if any.

The classes-writer 1394 generates a collection audits 1598, each a member function corresponding to an instance of the class 1036. An exemplary member function of the audits 1598 is also depicted. Each element of the audit-requirements 1210 generates a code seqment, in which the requirement is evaluated, and, if the evaluation fails, a message is logged and failure is returned. If all the requirements are met, the audit succeeds.

5.2 Documentation Generators

Figure 76:
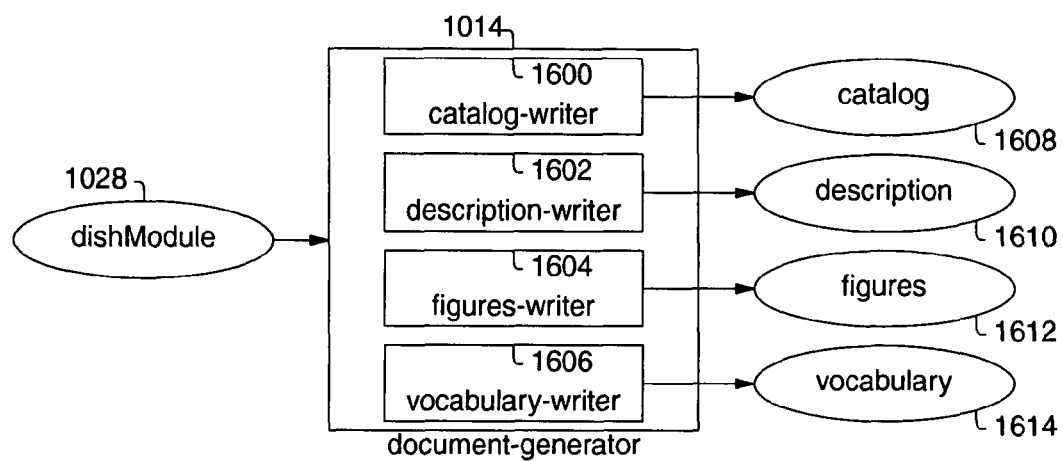
FIG. 76 depicts a summary of the document generators.

Refer to FIG. 76. Elements of the document-generator 1014 variously process an instance of the module 1028 to produce catalog, description, figures, and vocabulary corresponding to the module instance. The document-generator 1014 includes a generator catalog-writer 1600, which defines a comprehensive parts list (catalog) for the constituents of a module. The document-generator 1014 includes a generator description-writer 1602 which provides a textual description of the constituents of a module. The document-generator 1014 includes a generator figures-writer 1604, which provides graphical depictions of the constituents of a module. The document-generator 1014 includes a generator vocabulary-writer 1606, which provides a comprehensive listing of textual terms representing the constituents of a module.

5.2.1 Catalog Writer

The processor catalog-writer 1600 produces a catalog 1608 from the constituents of an instance of the module 1028. The catalog-writer 1600 specializes the viewer 1592. The catalog-writer 1600 processes an instance of the module 1028. The catalog-writer 1600 visits classes and members, generating a part element for each visited instance. Each generated part element includes a textual identifier, a category (e.g., "class", "member-datum", etc), a term (suitable for use in the body of a document), and a handle (suitable for use in the figures of a document). The collection of generated part elements provides a catalog.

5.2.2 Description Writer

The processor description-writer 1602 generates description 1610, including textual descriptions of the constituents of a module. The description-writer 1602 specializes the viewer 1592. The description-writer 1602 processes a supplied instance of the module 1028. The description-writer 1602 visits classes and members. A summary description of the contained classes is generated. The summary description of each contained class includes the purpose 1112, if any. A detailed description is also provided for each module, including a description of module-level generated classes, such as the host, viewer, editor, factory, etc.

The description-writer 1602 visits each instance of the class 1036. For each class, an overview is generated which describes the purpose 1112 of the class (if any), the genera 1176 of the class (if any), the members of the class (if any), incorporating the purpose 1112 for each member, if any. The class overview also incorporates any remarks 1116 or notes 1118. The overview also describes the species 1180 of the class (if any).

The description-writer 1602 visits each instance of the member 1046. For each member datum, a paragraph is generated which describes the type of the member datum, the purpose 1112 of the member datum (if any), and any remarks 1116 or notes 1118. Any specified acceptor for the member datum is also described. For each member function, a paragraph is generated which describes the return type of the member function, the arguments of the member function (if any), the purpose 1112 of the member function (if any), and any remarks 1116 or notes 1118.

5.2.3 Figures Writer

The processor figures-writer 1604 generates figures 1612, including graphical depictions of the constituents of a module. The figures-writer 1604 specializes the viewer 1592. The figures-writer 1604 processes a supplied instance of the module 1028. The figures-writer 1604 visits classes and members. The figures-writer 1604 provides a figure which depicts the supplied module (using the synthetic language of the parser 1008), including module predicates, module-scope members (i.e. host members), and root classes.

For each instance of the class 1036, the figures-writer 1604 depicts class predicates, members of the class and species of the class.

For each instance of the member-datum 1052, the figures-writer 1604 depicts the type, the scope handle, and predicates for the datum.

For each instance of the member-function 1048 the figures-writer 1604 depicts the return type, the scope handle, the argument list, and predicates for the member function.

5.2.4 Vocabulary Writer

The processor vocabulary-writer 1606 generates a vocabulary 1614, including a comprehensive listing of textual terms representing the constituents of a module. The vocabulary-writer 1606 specializes the viewer 1592. The vocabulary-writer 1606 visits each instance of the entity 1026. For each entity, if the term 1108 is non-empty, a vocabulary entry is generated which incorporates the term and a brief description incorporating the purpose 1112 of the entity.

I claim:

1. A computer-implemented method of processing a textual tag and a textual complement to provide type-safe assignment in an application-specific data structure, comprising the steps configured to execute by a processor:

creating a predicator specialization,
said predicator specialization specializing a generic predicator, and
said predicator specialization having said textual tag and said textual complement;

applying to said predicator specialization, a specific target,
said specific target included in said application-specific data structure, and
said specific target an instance of a first object-oriented class;

creating a promissary reference, said promissary reference having said specific target, said textual tag, and said textual complement;

storing said promissary reference as a promissary reference base in a depository,
said promissary reference base generalizing said promissary reference, and
said promissary reference base having access to said textual complement;

creating a specific object,
said specific object included in said application-specific data structure,
said specific object an instance of a second object-oriented class, said second object-oriented class not necessarily distinct from said first object-oriented class, and
said specific object associated with said textual complement;

storing said specific object, as a genetic object, said genetic object resolvable according to said textual complement;

retrieving said promissary reference base from said depository;

resolving said textual complement from said promissary reference base to said generic object;

dispatching a generic promissary dispatch to said genetic object, said promissary dispatch providing said promissary reference base, and said generic promissarydispatch specializing to a specialized promissary dispatch to said specific object;

dispatching a generic promissary acceptor operation to said promissary reference base, said generic promissary acceptor operation providing said specific object, and said generic promissary acceptor operation specializing to a specific promissary acceptor operation to said promissary reference; and accepting in said specific promissary acceptor operation, said type-safe assignment of said specific-object to said specific target of said promissary reference.

2. A computer-implemented method of processing a module specification to produce predicator definitions said predicator definitions suitable for processing a textual tag and a textual complement to provide type-safe assignment in an application-specific data structure, comprising the steps configured to execute by a processor:

processing a module instance to produce a predicator base class definition,
said module instance included in said module specification,
said predicator base class definition included in said predicator definitions;

processing a target categorical class instance to produce a generic predicator apply operation,
said target categorical class instance included in said module specification,
said target categorical class instance specifying a target categorical class definition,
said generic predicator apply operation included in said predicator base class definition, and
said generic predicator apply operation provided with a target argument supplying an instance of said target categorical class definition;

processing said module instance to produce a promissary reference base class definition,
said promissory reference, base class definition included in said predicator definitions;

processing said object categorical class instance to produce a generic promissary accept operation,
said generic promissary accept operation included in said promissary reference base class definition,
said generic promissary accept operation provided with an object argument supplying an instance of said object categorical class definition;

processing said member datum instance to produce a promissary reference class definition,
said promissary reference class definition included in said predicator definitions,
said promissary reference class definition specializing said promissary reference base class definition,
said promissary reference class definition having a target datum supplying an instance of said target categorical class definition,
said promissary reference class definition having a specialized accept operation,
said specialized accept operation provided with an object argument corresponding to an instance of said object categorical definition, in which a type-safe assignment is performed, wherein an object instance of said object categorical class definition corresponding to said object argument is assigned to a member datum specified by said member datum instance, said member datum included in said target datum; and processing a member datum instance to produce a predicator specialization,
said member datum instance included in said target categorical class instance,
said member datum instance specified by an instance of an object categorical class definition,
said object categorical class definition corresponding to an object categorical class instance included in said module specification, and
said object categorical class instance not necessarily distinct from said target categorical class instance, said predicator specialization included in said predicator definitions,
said predicator specialization specializing said predicator base class definition, and
said predicator specialization having a specific predicator apply operation,
said specific predicator apply operation a member function of said predicator specialization, and
said specific predicator apply operation specializing said generic predicator apply operation;
said specific predicator apply operation creating an instance of said promissary reference class definition, provided with said target argument,
said textual tag, and said textual complement.

* * * * *